(12) United States Patent
Onizuka et al.

(10) Patent No.: US 12,457,447 B2
(45) Date of Patent: Oct. 28, 2025

(54) BEAMFORMING MICROPHONE SYSTEM, SOUND PICKUP PROGRAM AND SETTING PROGRAM FOR BEAMFORMING MICROPHONE SYSTEM, BEAMFORMING MICROPHONE SETTING DEVICE, AND BEAMFORMING MICROPHONE SETTING METHOD

(71) Applicant: Audio-Technica Corporation, Tokyo (JP)

(72) Inventors: Kazuhiro Onizuka, Tokyo (JP); Eri Nakano, Tokyo (JP); Shinken Kanemaru, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 314 days.

(21) Appl. No.: 17/936,165

(22) Filed: Sep. 28, 2022

(65) Prior Publication Data

US 2023/0111227 A1 Apr. 13, 2023

(30) Foreign Application Priority Data

Oct. 12, 2021 (JP) .................... 2021-167749

(51) Int. Cl.
*H04R 1/40* (2006.01)
*H04N 23/00* (2023.01)
(52) U.S. Cl.
CPC ............. *H04R 1/406* (2013.01); *H04N 23/00* (2023.01)

(58) Field of Classification Search
CPC ........ H04R 1/406; H04R 27/00; H04R 3/005; H04R 2201/40; H04R 2430/20;
(Continued)

(56) References Cited

U.S. PATENT DOCUMENTS 11,425,502 B2 * 8/2022 Nielsen ................ H04R 5/027
2011/0093273 A1 4/2011 Lee et al.
(Continued)

FOREIGN PATENT DOCUMENTS

EP 2320677 A1 5/2011
EP 3644624 A1 4/2020

*Primary Examiner* — Yosef K Laekemariam
(74) *Attorney, Agent, or Firm* — WCF IP

(57) ABSTRACT

A beamforming microphone system capable of reducing a processing load caused by calculation of directivity and flexibly setting an area where sound is picked up. A beamforming microphone system according to the present invention includes: a plurality of microphone units; a signal processing unit that processes a sound pickup signal from each microphone unit at each predetermined time; and a storage that associates, for each sound pickup area, sound pickup area information with individual-sound-pickup-area position information freely set within the sound pickup area and stores the information. The signal processing unit includes a position information identification unit that identifies sound source position information, a signal generation unit that generates the sound signal corresponding to the sound from the sound source position, and a channel assignment unit that assigns an output channel, based on the individual-sound-pickup-area position information on the individual sound pickup area to which the sound source position belongs.

11 Claims, 14 Drawing Sheets

(58) Field of Classification Search
CPC ...... H04R 1/40; H04N 23/00; G10L 21/0216; G10L 25/78; G10L 2021/02166
See application file for complete search history.

(56) References Cited

U.S. PATENT DOCUMENTS

| | | |
|---|---|---|
| 2011/0093723 A1 | 4/2011 | Brown et al. |
| 2015/0201278 A1 | 7/2015 | Bao et al. |
| 2020/0068297 A1 | 2/2020 | Rollow, IV et al. |
| 2021/0051397 A1* | 2/2021 | Veselinovic ........... H04R 3/005 |

* cited by examiner

BEAMFORMING MICROPHONE SYSTEM, SOUND PICKUP PROGRAM AND SETTING PROGRAM FOR BEAMFORMING MICROPHONE SYSTEM, BEAMFORMING MICROPHONE SETTING DEVICE, AND BEAMFORMING MICROPHONE SETTING METHOD

TECHNICAL FIELD

The present invention relates to a beamforming microphone system, a sound pickup (collection) program and a setting program for the beamforming microphone system, an information processing device, and an information processing method.

BACKGROUND ART

In recent years, a sound pickup device (sound pickup system) applying a beamforming technique has been used as a ceiling microphone to be attached to a ceiling of a room such as a conference room, a classroom, or a lecture hall. The sound pickup device includes a plurality of microphone units and has a function of identifying a sound source position in a room, based on a signal from each microphone unit. The sound pickup device outputs a signal (sound signal corresponding to sound from the sound source) as if to pick up the sound by directing a narrow-directivity microphone with sharp directivity to the sound source (speaking person). At this time, the sound pickup device operates as if to form the directivity of a microphone unit group (microphone array) constituted of the plurality of microphone units by directing a beam to the sound source. In other words, the sound pickup device has the directivity following the sound source and has high sensitivity to the sound source. Therefore, such a sound pickup device is also referred to as a beamforming microphone by likening the directivity following the sound source to the beam.

Ideally, the beamforming microphone is required to repeatedly perform an operation (calculation of directivity) as if to search for and identify a sound source position throughout a room at all time and direct the directivity of the microphone to the identified sound source. However, since the search processing for the sound source and the calculation of directivity are required at all times, a processing load caused by such calculation becomes large. For this reason, not only a high-performance processing device (such as a processor) is required for the operation of the sound pickup device, but also the operation may become unstable due to a malfunction such as thermal runaway. Further, when a sound signal from the beamforming microphone is output to a signal processing device such as a mixer via 1ch output channel in order to reduce the calculation load, a different sound signal is input to the signal processing device following switching of the sound source (speaking person). In this configuration, when volume of each speaking person's voice is different, for example, it is difficult to adjust the signal according to the switching of the sound source in such a way as to strengthen a sound signal corresponding to a speaking person with a low voice and weaken a sound signal corresponding to a speaking person with a loud voice. Further, when a speaker for outputting a picked-up sound is installed in the same room as the sound pickup device such as a lecture hall, the sound pickup device recognizes and picks up the sound from the speaker as the sound source, and thus howling may occur.

Techniques for solving these problems have been proposed in a microphone array type sound pickup device (beamforming microphone system) to which the beamforming technique is applied (for example, see PTL 1 and PTL 2).

In a technique disclosed in PTL 1, a pre-designated sector (area) of a hemispherical search grid (sound pickup area) is set as an excluded sector where sound pickup is excluded. The range of the excluded sector is set by using a polar angle (elevation angle) and an azimuth angle (rotation angle). Thus, the technique is able to set the range of the excluded sector not only in a specific direction but also in all directions within a predetermined polar angle. Consequently, the technique excludes sound pickup from a noise source without identifying a position (direction) of the noise source (projector or speaker) installed on a ceiling or on a wall near the ceiling.

However, in this technique, since the excluded sector is set using the polar angle and the azimuth angle, a position and a shape of the excluded sector may be restricted. Further, in the technique capable of setting the excluded sector, an area where individual sound pickup is desired (individual sound pickup area: an area where the directivity is directed to the sound source) is indirectly set as an area where the excluded sector is excluded. That is, this technique is not able to implement flexible setting for the individual sound pickup area. Further, in this technique, the whole area other than the excluded sector is a target to search for and locate the sound source. Accordingly, the sound signal corresponding to the picked-up sound by the microphone array system applying the same technique is output via only 1ch output channel. Therefore, this technique is not able to reduce the above-described processing load nor execute the above-described signal adjustment processing.

In a technique disclosed in PTL 2, a sound pickup area is divided into a plurality of (for example, four or eight) areas (lobe areas), and an individual output channel is set for each divided area. In this technique, an area where sound is picked up (area where the directivity is directed to the sound source) and an area where sound pickup is excluded (excluded area) are settable according to setting of sound pickup availability for each area. However, in this technique, the number and a shape of the excluded areas depend on the number and a shape of the divided areas.

Further, in this technique, the sound picked up in each of the plurality of areas is output via an individual output channel corresponding to each area. Thus, the above-described signal adjustment processing for each output channel can be performed. However, in this technique, a combination of the number and the shape of the areas to be divided is predetermined in a microphone array system to which the technique is applied. Therefore, this technique is not able to set flexible areas such as a small area within an area, a large area across a plurality of areas, or a scattered areas composed of a plurality of physically separated small areas.

Further, in this technique, a lobe is formed for each divided area (i.e., the calculation of directivity is executed). Therefore, in this technique, the processing load caused by the calculation of directivity described above is large.

CITATION LIST

Patent Literature

[PTL 1] US 2020/0068297 A1, Description
[PTL 2] US 2021/0051397 A1, Description

SUMMARY OF INVENTION

Technical Problem

An object of the present invention is to provide a beamforming microphone system, a sound pickup program and a setting program for the beamforming microphone system, a beamforming microphone setting device, and a beamforming microphone setting method that are able to reduce a processing load caused by calculation of directivity and flexibly set an area where sound is picked up (area to which the directivity is directed).

Solution to Problem

A beamforming microphone system according to the present invention includes: a plurality of microphone units; a signal processing unit configured to process a sound pickup signal from each of the plurality of microphone units at each predetermined time; and a storage configured to associate, for each sound pickup area where the plurality of microphone units is able to pick up sound as a sound signal, sound pickup area information indicating a sound pickup area with individual-sound-pickup-area position information indicating a position of at least one of individual sound pickup areas freely set within the sound pickup area, and store the associated information, and the signal processing unit includes: a position information identification unit configured to identify sound source position information indicating a sound source position of a sound source in the individual sound pickup area, based on the sound pickup signal from each of the plurality of microphone units; a signal generation unit configured to generate the sound signal corresponding to the sound from the sound source position, based on the sound pickup signal from each of the plurality of microphone units; and a channel assignment unit configured to assign, to the individual sound pickup area, one output channel from which the sound signal is output, from among the plurality of output channels, based on the individual-sound-pickup-area position information on the individual sound pickup area to which the sound source position belongs.

Advantageous Effects of Invention

A beamforming microphone system according to the present invention is able to reduce a processing load caused by calculation of directivity and flexibly set an area where sound is picked up (area to which the directivity is directed).

BRIEF DESCRIPTION OF DRAWINGS

FIG. 10A illustrates a state in which a participant of a conference is speaking, FIG. 10B illustrates a state in which another participant of the conference is speaking, and FIG. 10C illustrates a state in which still another participant of the conference is speaking.

DESCRIPTION OF EMBODIMENTS

Embodiments of a beamforming microphone system (hereinafter referred to as "present system"), a sound pickup program of the beamforming microphone system (hereinafter referred to as "present sound pickup program) and a setting program of the beamforming microphone system (hereinafter referred to as "present setting program"), a beamforming microphone setting device (hereinafter referred to as "present device"), and a beamforming microphone setting method (hereinafter referred to as "present method") according to the present invention are described below with reference to the drawings.

The present invention sets at least one individual sound pickup area within a sound pickup area and identifies a position of a sound source (sound source position) within the individual sound pickup area by applying a beamforming technique (beamforming microphone technique). The present invention also generates a sound signal corresponding to sound from the sound source and processes the generated sound signal as a sound signal of an output channel set in the individual sound pickup area to which the sound source position belongs. Details of the sound signal is described later.

The "sound pickup area" is the maximum area that allows a microphone unit described later to pick up the sound from the sound source as the sound signal. A size and a shape of the sound pickup area are previously set (in the present embodiment, the shape is substantially conical having a reference point described later as the apex).

The "individual sound pickup area" is an area that covers a part or a whole part of the sound pickup area and an area where the sound from the sound source can be picked up as the sound signal when the sound source position belongs to the area. An output channel corresponding to the individual sound pickup area is previously set in the individual sound pickup area. Consequently, the sound signal belonging to the individual sound pickup area is output as the sound signal of the output channel set in the individual sound pickup area.

The "sound source" is a target that emits sound with the highest volume among targets (people, object) that emit some sound in each individual sound pickup area. That is, a plurality of sound sources may exist for each individual sound pickup area.

Beamforming Microphone System

Configuration of Beamforming Microphone System

First, an embodiment of the present system is described.

Figure 1:
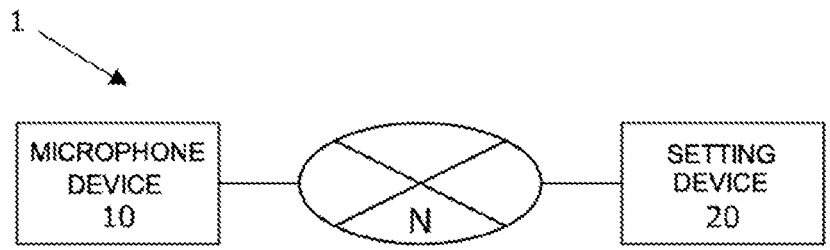
FIG. 1 is a network configuration diagram illustrating an embodiment of a beamforming microphone system according to the present invention.

FIG. 1 is a network configuration diagram illustrating the embodiment of the present system.

Figure 2:
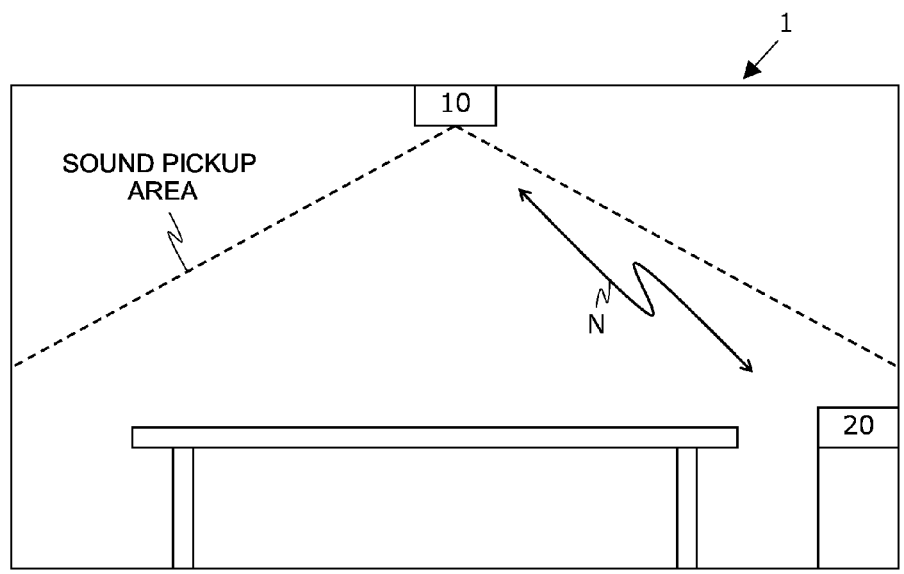
FIG. 2 is a schematic diagram illustrating an installation example of the beamforming microphone system in FIG. 1.

FIG. 2 is a schematic diagram illustrating an installation example of a present system 1.

The present system 1 identifies the sound source position within the individual sound pickup area, generates the sound signal corresponding to the sound from the sound source, and processes the generated sound signal as the sound signal of the output channel set in the individual sound pickup area to which the sound source position belongs. The present system 1 includes a microphone device 10 and an information processing device 20. Herein, the information processing device 20 is an example of the present device and is described as the "present device 20" in the following description. The microphone device 10 and the present device 20 are connected to each other via, for example, a network N, and transmit and receive information between each other.

The network N is, for example, a communication network such as a local area network (LAN), Wi-Fi (registered trademark), or Bluetooth (registered trademark).

Note that the network in the present invention may be a communication network such as the Internet, a mobile communication network, or a wide area network (WAN). In this case, the microphone device is remotely operable, for example, via the communication network.

Configuration of Microphone Device

Figure 3:
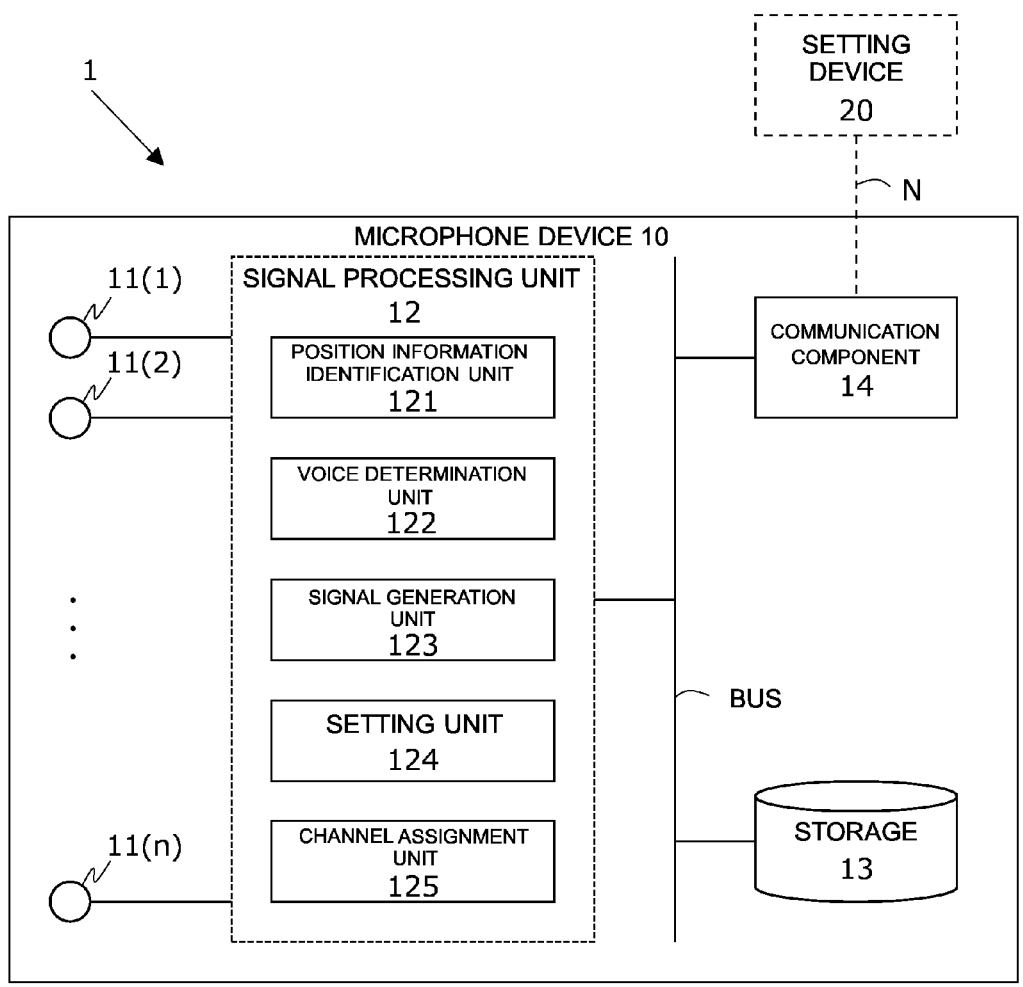
FIG. 3 is a functional block diagram of a microphone device included in the beamforming microphone system in FIG. 1.

FIG. 3 is a functional block diagram of the microphone device 10.

The microphone device 10 identifies the sound source position within the individual sound pickup area, generates the sound signal corresponding to the sound from the sound source, and outputs the generated sound signal as the sound signal of the output channel set in the individual sound pickup area to which the sound source position belongs. The microphone device 10 is, for example, a ceiling microphone device installed on a ceiling of a room such as a conference room. The microphone device 10 includes a housing (not illustrated, the same applies below), a plurality of microphone units 11 (1 to n units: n is an integer.), a signal processing unit 12, a storage 13, and a communication component 14. In the following description, when there is no need to distinguish each of the plurality of microphone units 11 (1 to n units), each unit is described as "microphone unit 11". Herein, "n" is, for example, "32".

The housing accommodates the microphone unit 11, the signal processing unit 12, the storage 13, and the communication component 14. The housing has, for example, a substantially square box shape in a plan view.

The microphone unit 11 picks up sound within the sound pickup area and generates an electric signal (hereinafter referred to as "sound pickup signal") corresponding to the sound. The microphone unit 11 is, for example, an omnidirectional microphone unit. Each of the microphone units 11 (1 to n units) constitutes one beamforming microphone (microphone array). Each of the microphone units 11 (1 to n units) is arranged, at predetermined angular intervals, on a plurality of concentric circles centered on the center point of the housing in the plan view, for example. The microphone unit 11 is accommodated in the housing.

The signal processing unit 12 controls operation of the microphone device 10 and processes the sound pickup signal from each of the microphone units 11 as described later. The signal processing unit 12 includes, for example, at least one processor such as a central processing unit (CPU), a random access memory (RAM) that functions as a work area of the CPU, and a read only memory (ROM) that stores various information such as the present sound pickup program. In the signal processing unit 12, the processor loads and executes the various programs stored in the ROM, thereby controlling the operation of the microphone device 10. The signal processing unit 12 is accommodated in the housing. The signal processing unit 12 includes a position information identification unit 121, a voice determination unit 122, a signal generation unit 123, a setting unit 124, and a channel assignment unit 125.

In the signal processing unit 12, the present sound pickup program operates and implements sound pickup processing (S2) described later. That is, the present sound pickup program causes the signal processing unit 12 (processor) to function as the position information identification unit 121, the voice determination unit 122, the signal generation unit 123, the setting unit 124, and the channel assignment unit 125 in the present invention.

The position information identification unit 121 identifies sound source position information in the individual sound pickup area, based on the sound pickup signal from each of the microphone units 11. Specific operation of the position information identification unit 121 is described later.

The "sound source position information" is information indicating a position of the sound source (sound source position) in the individual sound pickup area. The sound source position information is, for example, indicated by using coordinates in a polar coordinate system with the origin at a predetermined reference point set in the microphone device 10.

The "reference point" is, for example, the center point (the center point of the housing in the plan view in the present embodiment) of the concentric circles on which the plurality of microphone units 11 are arranged.

Note that the reference point in the present invention is not limited to the reference point in the present embodiment. That is, for example, the reference point may be the center of gravity of the housing, or may be the center point of a lower surface (or upper surface) of the housing.

The "coordinates in the polar coordinate system" are indicated by using an elevation angle (polar angle) and a rotation angle (azimuth angle) in the present embodiment. That is, in the present embodiment, the sound source position is indicated by using the angle (direction) from the reference point.

Note that the coordinates in the polar coordinate system may be indicated by using the elevation angle (polar angle), the rotation angle (azimuth angle), and a distance from the reference point.

The voice determination unit 122 determines whether the sound pickup signal from each of the microphone units 11 is a voice signal corresponding to voice of a speaking person. Specific operation of the voice determination unit 122 is described later.

The "speaking person" is a person speaking in the sound pickup area. The speaking person is an example of the sound source in the present invention.

The signal generation unit 123 generates the sound signal corresponding to the sound from the sound source position, based on the sound pickup signal from each of the microphone units 11. The operation of the signal generation unit 123 is described later.

The "sound signal" is a signal generated as a result of executing a predetermined signal processing for the sound pickup signal, and is an electric signal (audio signal) corresponding to sound picked up by the microphone device 10 (microphone array constituted of the plurality of microphone units 11) in a state as if to have narrow directivity and direct the directivity to the sound source (speaking person). In other words, the sound signal is a signal in which sound (voice) from the sound source is mainly picked up, and sound (voice of a person other than the speaking person, noise, and the like) from a position other than the sound source is suppressed.

The setting unit 124 defines the sound pickup area of the microphone device 10, based on the sound pickup area information. Further, the setting unit 124 sets the individual sound pickup area within the defined sound pickup area, based on input individual-sound-pickup-area position information. Specific operation of the setting unit 124 is described later.

The "sound pickup area information" is information indicating the sound pickup area. The sound pickup area information is, for example, indicated by using the coordinates in the polar coordinate system with the origin at the reference point of the microphone device 10.

The "individual-sound-pickup-area position information" is information indicating a position of the individual sound pickup area in the sound pickup area. The individual sound pickup area information is, for example, indicated by using the coordinates in the polar coordinate system with the origin at the reference point of the microphone device 10.

The channel assignment unit 125 assigns, to the individual sound pickup area, one output channel from which the sound signal is output from among the plurality of output channels, based on the individual-sound-pickup-area position information. Specific operation of the channel assignment unit 125 is described later.

The storage 13 stores information (for example, sound pickup area information, individual-sound-pickup-area position information, correspondence relation information described later, and the like) required for the operation of the microphone device 10. The storage 13 is, for example, an information storage medium constituted of a non-volatile memory.

The communication component 14 transmits and receives information to and from the present device 20 via the network N. The communication component 14 is, for example, a known communication interface for transmitting and receiving a packet.

Configuration of Information Processing Device

Figure 4:
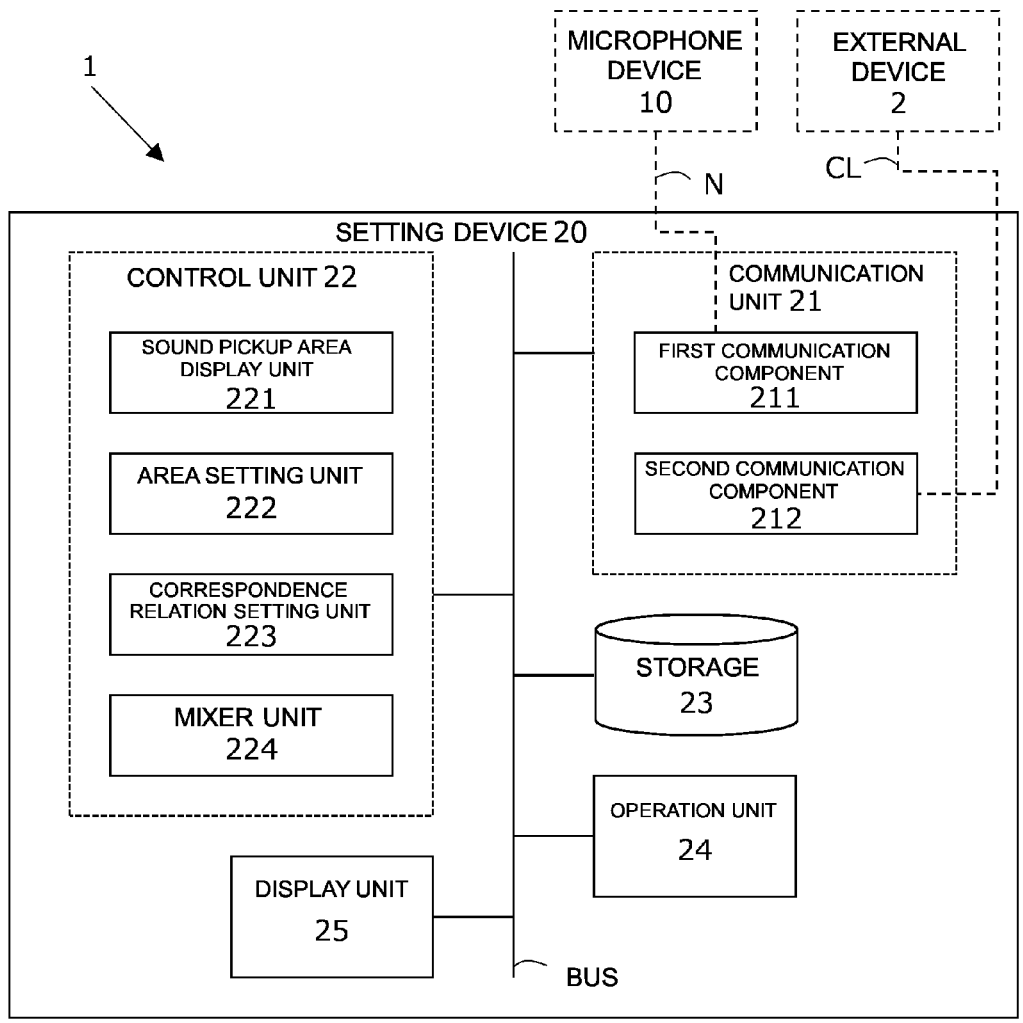
FIG. 4 is a functional block diagram illustrating an embodiment of an information processing device according to the present invention.

FIG. 4 is a functional block diagram illustrating an embodiment of the present device 20.

The present device 20 sets the microphone device 10. The present device 20 is, for example, a personal computer. The present device 20 is installed, for example, in a room such as a conference room where the microphone device 10 is installed. The present device 20 includes a communication unit 21, a control unit 22, a storage 23, an operation unit 24, and a display unit 25.

In the present device 20, the present setting program operates, cooperates with a hardware resource of the present device 20, and implements the present method described later. That is, the present setting program causes the computer to function as the present device 20. That is, the present setting program causes the computer to function as a sound pickup area display unit 221, an area setting unit 222, and a correspondence relation setting unit 223.

The communication unit 21 transmits and receives information to and from the microphone device 10 via the network N, and also outputs the sound signal to an external device 2 via, for example, a cable CL. The communication unit 21 includes a first communication component 211 and a second communication component 212. The first communication component 211 is, for example, a known communication interface for transmitting and receiving a packet. The second communication component 212 is, for example, a known output terminal for outputting the sound signal for each output channel described later to the external device 2. Herein, the external device 2 is, for example, a control device for a conference, a recorder, or a speaker.

The control unit 22 controls the operation of the present device 20. The control unit 22 includes, for example, at least one processor such as a CPU, a RAM that functions as a work area of the CPU, and a ROM that stores various information such as the present setting program. In the control unit 22, for example, the processor loads and executes various programs stored in the ROM, thereby controlling the operation of the present device 20. The control unit 22 includes the sound pickup area display unit 221, the area setting unit 222, the correspondence relation setting unit 223, and a mixer unit 224.

The sound pickup area display unit 221 overlappingly displays, on the display unit 25, a layout of a location where the microphone device 10 is installed (hereinafter referred to as "installation location") and the sound pickup area with each other. Specific operation of the sound pickup area display unit 221 is described later.

The "layout" is a drawing that visually represents the installation location (conference room in the present embodiment) in the plan view. The layout is, for example, a design drawing or a schematic diagram of the installation location, or an image of the installation location captured from a ceiling side. The layout is stored in the storage 23 as layout information indicating the layout.

Note that the layout information may include not only planar information (such as information indicating a length and a width of a floor) but also three-dimensional information (such as information indicating a height from the floor surface to the ceiling) of the installation location.

The area setting unit 222 sets the individual sound pickup area within the sound pickup area, based on operation of the operation unit 24. The area setting unit 222 functions as a candidate area information display unit and a position information setting unit in the present invention. Specific operation of the area setting unit 222 is described later.

The correspondence relation setting unit 223 sets correspondence relation between individual area position information and output channel information, based on the operation of the operation unit 24. Specific operation of the correspondence relation setting unit 223 is described later.

The "output channel information" is information indicating the output channel set (assigned) to the individual sound pickup area among the plurality of output channels.

The mixer unit 224 executes signal processing of amplification, attenuation, mixing, and the like, for the sound signal from the microphone device 10. The signal processing is executed for each output channel. That is, the mixer unit 224 functions as a mixer device for the audio signal. That is, the present device 20 also has a function as the mixer device for the audio signal.

The storage 23 stores information required for the operation of the present device 20 (e.g., the layout information, etc.), information to be transmitted to the microphone device 10 (e.g., the sound pickup area information, the individual-sound-pickup-area position information, the correspondence relation information, etc., generated by the present method described later), and information to be received from the microphone device 10 (e.g., the sound signal, etc.). The storage 23 is, for example, an information storage medium such as an HDD.

The "correspondence relation information" is information indicating the correspondence relation between the individual area position information and the output channel information. The correspondence relation information is set and stored for each individual area.

The operation unit 24 is a device operated by a user of the present device 20. The operation unit 24 includes at least a pointing device such as a mouth.

The display unit 25 overlappingly displays the layout, the sound pickup area, and the individual sound pickup area with one another. The display unit 25 is, for example, a liquid crystal display.

Note that the operation unit and the display unit in the present invention may be configured as one touch panel display. In this case, the touch panel functions not only as the display unit in the present invention but also as the pointing device (operation unit) in the present invention.

Operation of Beamforming Microphone System

Next, operation of the present system 1 is described with reference to FIG. 3 and FIG. 4.

Figure 5:
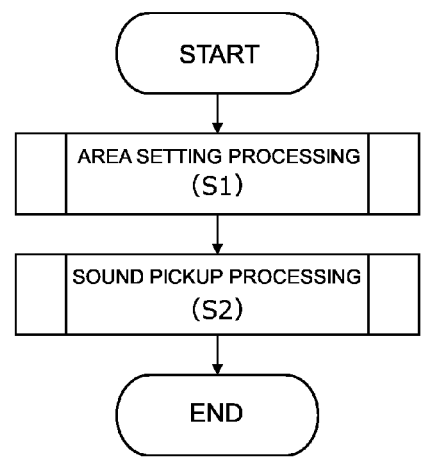
FIG. 5 is a flowchart illustrating an operation of the beamforming microphone system in FIG. 1.

FIG. 5 is a flowchart illustrating the operation of the present system 1.

The present system 1 executes area setting processing (S1) and sound pickup processing (S2).

In the present system 1, the present device 20 defines the sound pickup area of the microphone device 10 and sets the individual sound pickup area in the area setting processing (S1) as described later. Then, in the sound pickup processing (S2), the microphone device 10 picks up the sound in the sound pickup area, identifies the sound source position, determines the voice, generates the sound signal, and outputs (transmits) the sound signal for each output channel to the present device 20 in the present system 1.

Area Setting Processing

First, the area setting processing (S1) is described. In the following description of the area setting processing (S1), the layout, the sound pickup area, the candidate area, and the individual sound pickup area are indicated with reference signs for convenience of description.

Figure 6:
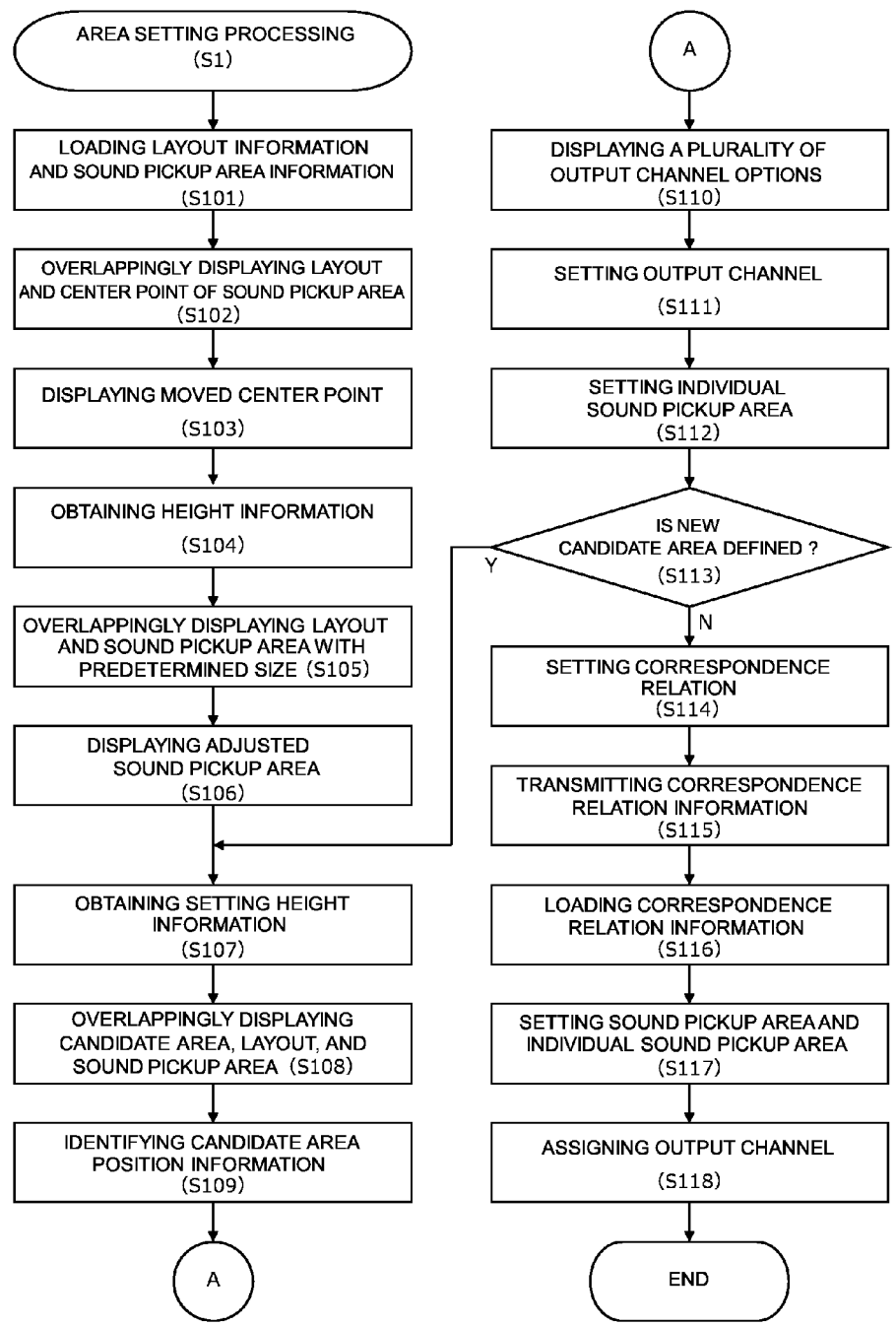
FIG. 6 is a flowchart of area setting processing included in the operation in FIG. 5.

FIG. 6 is a flowchart of the area setting processing (S1).

Figure 7:
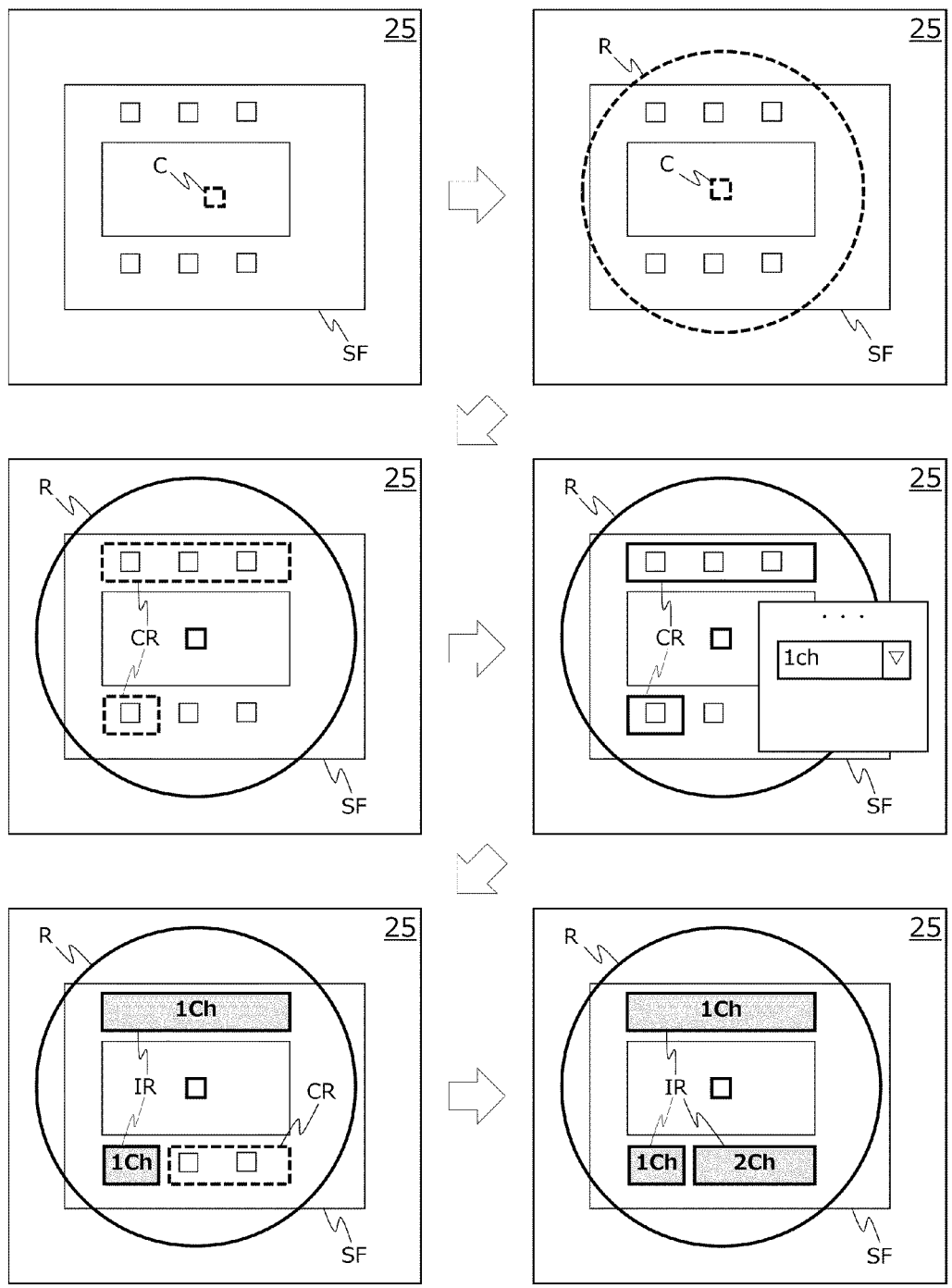
FIG. 7 is a schematic diagram illustrating an example of information to be displayed on a display unit included in the information processing device in FIG. 4 in the area setting processing in FIG. 6.

FIG. 7 is a schematic diagram illustrating examples of information displayed on the display unit 25 in the area setting processing (S1).

The "area setting processing (S1)" is processing of executing, as a prior preparation for the sound pickup processing (S2), processing of defining a sound pickup area R for a layout SF and processing of setting one or more individual sound pickup areas IR for the sound pickup area R. The area setting processing (S1) is mainly executed by the present device 20. The area setting processing (S1) is an example of the present method.

First, the control unit 22 of the present device 20 loads the layout information of a place where the sound pickup area R is defined (e.g., conference room) and the sound pickup area information of the microphone device 10 from the storage 23 (S101).

Then, the sound pickup area display unit 221 overlappingly displays, on the display unit 25, the layout SF and the center point (the reference point of the microphone device 10) C of the sound pickup area R with each other, based on the layout information and the sound pickup area information (S102).

Then, while looking at the display unit 25, a user moves the position of the center point (the reference point of the microphone device 10) C of the sound pickup area R to a position corresponding to the installation location of the microphone device 10 in the layout SF via the operation unit 24 (pointing device). At this time, the sound pickup area display unit 221 displays the moved center point C on the display unit 25 (S103).

Then, the user of the present device 20 inputs a height (distance from the floor surface to the ceiling) of the place corresponding to the layout information via the operation unit 24. At this time, the control unit 22 obtains information (height information) indicating the height corresponding to the layout information (S104). The height information is, for example, associated with the layout information and is stored in the storage 23.

Then, the sound pickup area display unit 221 overlappingly displays, on the display unit 25, the sound pickup area R with a predetermined height (e.g., floor surface) and a predetermined size (e.g., a size corresponding to an elevation angle set as a default) and the layout SF with each other (S105).

Then, the user adjusts the size (boundary) of the sound pickup area R. Specifically, the user inputs (specifies) the height for setting the boundary of the sound pickup area R via the operation unit 24. Then, while looking at the display unit 25, the user adjusts the size of the sound pickup area R at the specified height via the operation unit 24. At this time, the user confirms a sound pickup state of sound generated at the predetermined height (input height) of a predetermined area (e.g., a corner of the conference room) in the setting location of the sound pickup area R, and finely adjusts the size of the sound pickup area R, as necessary. The sound pickup area display unit 221 displays the sound pickup area R at the height input by the user on the display unit 25 (S106: sound pickup area defining processing). The sound pickup area R after moving the center point C and adjusting the size is defined as a new sound pickup area R and sound pickup area information corresponding to the defined sound pickup area R is stored, for example, in the storage 23.

Then, the user inputs (specifies) a height (from the floor surface) to set the individual sound pickup area IR via the operation unit 24. At this time, the control unit 22 obtains information (setting height information) indicating the height to set the individual sound pickup area IR (S107). The setting height information is, for example, associated with the layout information and is stored in the storage 23. Herein, the height to set the individual sound pickup area IR is, for example, a height at which a speaking person's mouth is assumed to be located (e.g., around 110 cm in a seated position and around 140 cm in a standing position).

Then, while looking at the display unit 25, the user defines any number and size of small areas within the layout SF and within the sound pickup area R via the operation unit 24 (pointing device), for example. At this time, the area setting unit 222 overlappingly displays, on the display unit 25, at least one of the defined small areas as one area to be a candidate for the individual sound pickup area IR (hereinafter referred to as "candidate area CR"), the layout SF, and the sound pickup area R with one another (S108). In the present embodiment, the small area has a rectangular shape, for example.

Note that the number of small areas is not limited to "1". That is, for example, the number of small areas may be "2" or more. At this time, each small area may be arranged (physically) apart from one another, or a portion of each small area may be contacted. That is, the candidate area may be constituted of one area where the plurality of small areas is combined, or may be constituted of the plurality of small areas arranged apart from one another.

Further, the shape of the small area is not limited to rectangular. That is, for example, the shape of the small area may be circular or may be a closed shape formed by a so-called freeform.

Then, the area setting unit 222 identifies information indicating a position of the candidate area CR (hereinafter referred to as "candidate area position information") (S109). At this time, the area setting unit 222 adds height information to coordinates of the candidate area CR that is two-dimensional information, converts the coordinates into the coordinates in the polar coordinate system that is three-dimensional information, and identifies the candidate area position information. The identified candidate area position information is associated with the sound pickup area information and is stored, for example, in the storage 23.

Then, the area setting unit 222 displays a plurality of output channel options on the display unit 25, for example (S110).

Then, while looking at the display unit 25, the user selects an output channel corresponding to the candidate area CR from among the plurality of output channel options via the operation unit 24. At this time, the area setting unit 222 sets the selected output channel as the output channel corresponding to the candidate area CR (S111).

Then, the area setting unit 222 sets the candidate area CR to which the output channel is set as the individual sound pickup area IR (S112). That is, the area setting unit 222 sets the candidate area position information as the individual-sound-pickup-area position information. Consequently, the set individual-sound-pickup-area position information is associated with the corresponding output channel information and is stored, for example, in the storage 23. Herein, the processing in S107 to S112 is an example of the setting processing of the individual sound pickup area IR in the present invention.

Then, the area setting unit 222 determines whether a new candidate area CR is defined (S113). When the new candidate area CR is defined ("Y" in S113), the area setting unit 222 executes the processing in S107 to S112. In this case, a plurality of individual sound pickup areas IR is set for one sound pickup area R, and the output channel is set for each individual sound pickup area IR.

When the new candidate area CR is not defined ("N" in S113), the correspondence relation setting unit 223 sets correspondence relation between the individual-sound-pickup-area position information and the output channel information corresponding to the individual-sound-pickup-area position information for each individual sound pickup area IR (S114). The correspondence relation information indicating the set correspondence relation is associated with the sound pickup area information and is stored, for example, in the storage 23. That is, the correspondence relation information is associated with the sound pickup area information, at least one individual-sound-pickup-area position information, and the output channel information for each sound pickup area. In this way, the correspondence relation information and the sound pickup area information stored in the storage 23 are used as initial setting information when next area setting processing (S1) is executed, for example.

Figure 8:
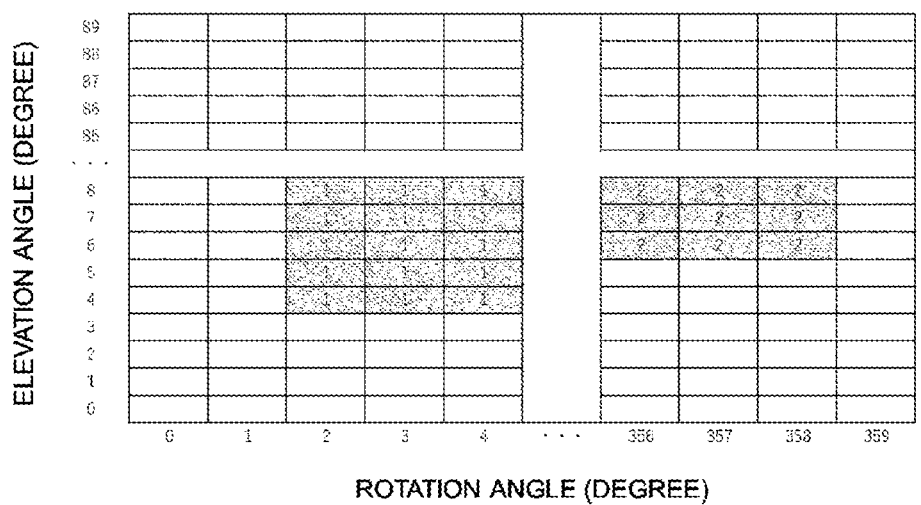
FIG. 8 is a schematic diagram illustrating an example of information to be stored in a storage included in the information processing device in FIG. 4.

FIG. 8 is a schematic diagram illustrating an example of the correspondence relation information stored in the storage 23.

In FIG. 8, the sound pickup area information is indicated by using two angles: elevation angle and rotation angle. The cells in grey color indicate the individual sound pickup area IR (individual-sound-pickup-area position information). The numbers in the cells indicate an identification number (output channel information) of the output channel set in the individual sound pickup area position.

Note that the correspondence relation information in the present invention is an example, and is not limited to FIG. 8. That is, for example, the correspondence relation information in the present invention may be stored in the storage by using a plurality of interrelated tables or the like.

Referring back to FIG. 6 and FIG. 7, the communication unit 21 then transmits the correspondence relation information to the microphone device 10 via the network N (S115). The correspondence relation information transmitted from the present device 20 is stored in the storage 13 of the microphone device 10.

Then, the setting unit 124 of the microphone device 10 loads the correspondence relation information from the storage 13 (S116).

Then, the setting unit 124 sets the sound pickup area R and the individual sound pickup area IR of the microphone device 10, based on the correspondence relation information (S117). That is, the setting unit 124 updates the sound pickup area information and the individual sound pickup area information in the microphone device 10.

Then, the channel assignment unit 125 assigns the output channel to the individual sound pickup area IR, based on the correspondence relation information (S118). Specifically, the channel assignment unit 125 refers to the correspondence relation information (i.e., individual sound pickup area information, output channel information), and identifies one output channel set for (i.e., corresponding to) each individual sound pickup area IR. Then, the channel assignment unit 125 assigns the identified one output channel to the corresponding individual sound pickup area IR as the output channel from which the sound signal is output.

In this way, the present device 20 sets any number and size of individual sound pickup areas IR for each sound pickup area R, based on the operation by the user. That is, the present device 20 is able to flexibly set at least one individual sound pickup area IR for each sound pickup area R. Further, the present device 20 sets the output channel for each individual sound pickup area IR and transmits the correspondence relation to the microphone device 10. In other words, the present device 20 indirectly controls the operation of the microphone device 10 in such a way as to generate and output only a sound signal corresponding to sound from a sound source belonging to the individual sound pickup area IR. That is, the microphone device 10 generates the sound signal belonging to the individual sound pickup area IR, but does not generate a sound signal belonging to an area other than the individual sound pickup area IR. Thus, the setting of the individual sound pickup area IR and the output channel by the present device 20 controls the generation of the sound signal of the microphone device 10. Consequently, a processing load of the microphone device 10 is reduced, as compared with the case where the whole sound pickup area is searched at all time and the sound signal is generated.

Note that the area setting processing is not limited to the present embodiment as long as the individual sound pickup area corresponding to the sound pickup area is settable. That is, for example, in the area setting processing, a part of the processing order may be changed, some processing need not be executed, or another processing may be added.

Further, when the height information is previously included in the layout information, the control unit of the present device may obtain the height information, based on the layout information in the processing in S104.

Further, the position of the center point of the sound pickup area and/or the size of the sound pickup area may be previously set according to the layout. In this case, the present device may execute the processing in S103 and S106, based on preset information (initial setting information).

Further, the microphone device in the present invention may include an imaging device capable of capturing an overhead image of an installed room. In this case, the image captured by the imaging device may be used instead of the layout. In this configuration, the sound pickup area is settable based on a zooming function of the imaging device and the height information, and a maximum sound pickup range and a maximum imageable range of the microphone device can be linked. Consequently, the setting of the sound pickup area can be simplified.

Further, the processing in S116 to S118 of the setting unit and the channel assignment unit in the present invention may be executed as separate processing from the area setting processing.

Sound Pickup Processing

Figure 9:
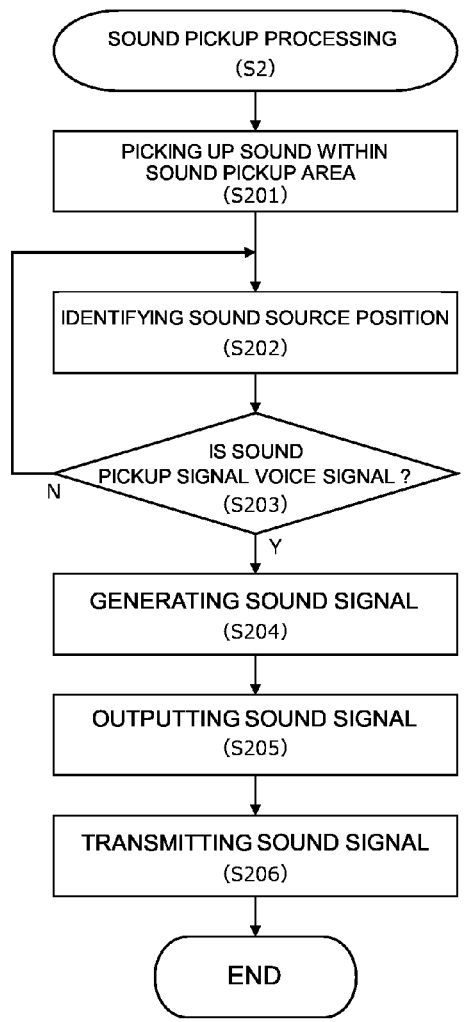
FIG. 9 is a flowchart of sound pickup processing included in the operation in FIG. 5.

FIG. 9 is a flowchart of the sound pickup processing (S2).

The "sound pickup processing (S2)" is processing of executing, at each predetermined time, identification processing for a sound source position, voice determination processing, sound signal generation processing, and sound signal output processing for each output channel, while sound generated in the sound pickup area is picked up at all time. The sound pickup processing (S2) is executed by the microphone device 10.

First, each of the microphone units 11 starts to pick up sound within the sound pickup area (S201). That is, each of the microphone units 11 generates a sound pickup signal corresponding to the picked-up sound, and transmits the sound pickup signal to the signal processing unit 12. At this time, the signal processing unit 12 repeatedly executes a series of processing (S202 to S204) described later at each predetermined time.

The "predetermined time" is an interval of time when the microphone device 10 executes a series of the processing described later. The predetermined time is previously set. In the present embodiment, the predetermined time is 5 ms. That is, the microphone device 10 executes a series of the processing described later at predetermined time intervals (5 ms).

At each predetermined time, the position information identification unit 121 identifies (searches) the sound source position (sound source position information) of the sound source in the individual sound pickup area, based on the sound pickup signal from each of the microphone units 11 (S202: identification processing for the sound source position). Specifically, the position information identification unit 121 uses, for example, a known beamforming microphone technique and identifies the sound source position information of the sound source that emits a sound with the highest volume at a moment of searching in the individual sound pickup area. At this time, the position information identification unit 121 identifies the sound source position not in the whole sound pickup area but only in one or more individual sound pickup areas set within the sound pickup area.

Then, the voice determination unit 122 determines whether the sound pickup signal corresponds to voice of the speaking person, based on the sound pickup signal from each of the microphone units 11 (S203: voice determination processing). Specifically, the voice determination unit 122 determines whether the sound pickup signal is a voice signal by using, for example, a known voice activity detection (VAD) technique.

When the voice determination unit 122 determines that "the sound pickup signal is the voice signal" ("Y" in S203), the signal generation unit 123 generates a sound signal corresponding to the sound (i.e., speaking person's voice) from the sound source position, based on the sound pickup signal from each of the microphone units 11 (S204: sound signal generation processing). Specifically, the signal generation unit 123 applies the known beamforming microphone technique and generates the sound signal. In this case, the plurality of microphone units 11 constitutes one beamforming microphone of which pseudo narrow directivity is directed to the sound source. In other words, when the signal generation unit 123 generates the sound signal, a virtual beam that indicates the narrow directivity (hereinafter simply referred to as "directivity") of the beamforming microphone is directed to the sound source.

In contrast, when the voice determination unit 122 determines that "the sound pickup signal is not the voice signal" ("N" in S203), the sound pickup processing (S2) returns to the processing in S202.

In this way, the microphone device 10 does not identify the sound source position nor generate nor output the sound signal for an area where the output channel is not set (area other than the individual sound pickup area). That is, the microphone device 10 does not direct the directivity (virtual beam indicating the directivity) to the area where the output channel is not set.

Then, the signal processing unit 12 outputs the sound signal for each output channel to the communication component 14 (S205).

Then, the communication component 14 transmits the sound signal for each output channel to the present device 20 via the network N (S206). Consequently, the present device 20 is able to execute various signal processing for the sound signal for each output channel by using the mixer unit 224. Examples of various signal processing include signal processing and the like that, for example, increases only a level of the sound signal from the individual sound pickup area to which a speaking person with a small voice or a high-priority speaking person (e.g., a president of a corporation) belongs, or that mutes or temporarily removes the sound signal from the individual sound pickup area to which a speaking person who is making unnecessary utterance (e.g., a chat) belongs. Further, since the output channel is set for each individual sound pickup area, signal processing such as auto gain sharing and echo cancellation for each output channel is also applicable. Therefore, when the level of the sound signal from the individual sound pickup area to which the loud speaking person belongs exceeds the upper limit, the level can be automatically adjusted.

In this way, the present system 1 (the present device 20) sets any number and size of individual sound pickup areas, based on the operation by the user and also sets the output channel for each individual sound pickup area. Consequently, in the present system 1, the individual sound pickup area based on the operation by the user is flexibly settable in the sound pickup area.

Further, the present system 1 (the microphone device 10) identifies (searches) a speaking person in the individual sound pickup area at the predetermined time intervals (5 ms) and directs the directivity to the speaking person only when the speaking person is speaking. That is, the present system 1 executes calculation to direct the directivity (hereinafter referred to as "calculation of directivity") only to the individual sound pickup area, but not to the whole sound pickup area. For this reason, in the present system 1, the calculation amount (number of times) of directivity is smaller than that of a conventional system executing the calculation of directivity for the whole sound pickup area and that of a conventional system executing the calculation of directivity for each divided sound pickup area (hereinafter collectively referred to as "conventional system"). Consequently, the processing load caused by the calculation by the present system 1 (the signal processing unit 12) is reduced.

Note that the sound pickup processing is not limited to the present embodiment as long as a series of processing is executable at predetermined time intervals. That is, for example, in the sound pickup processing, another processing may be added.

Further, in the sound pickup processing, the microphone device in the present invention identifies the sound source position within the sound pickup area, determines whether the identified sound source position belongs to any of the individual sound pickup area, and may generate the sound signal only when the sound source position belongs to the individual sound pickup area. In this case, the microphone device (the signal processing unit) in the present invention functions, for example, as a determination unit (of the area) to determine whether the sound source position belongs to the individual sound pickup area, based on the individual sound pickup area information and the sound source position information.

EXAMPLES

Next, referring to FIG. 3 and FIG. 4, examples of the present system 1 is described. In the following description of the examples, the sound pickup area, the individual sound pickup area, the small area included in the individual sound pickup area, and a speaking person (participant, assistant, chairperson, assembly member, etc.) are indicated with reference signs for convenience of description.

Example 1

Figure 10:
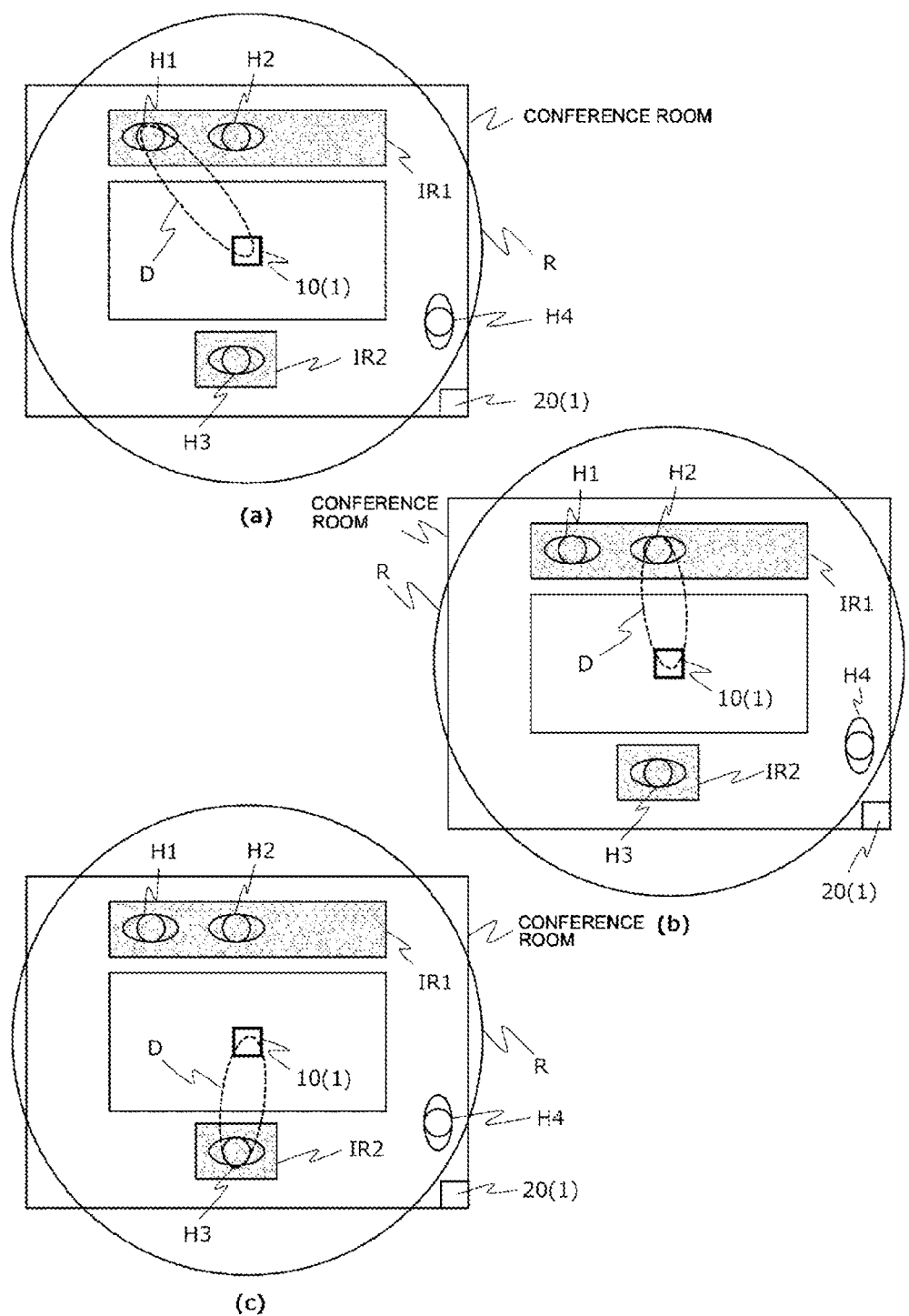
FIG. 10 is a schematic diagram illustrating a first example of the beamforming microphone system in FIG. 1.

FIG. 10 is a schematic diagram illustrating a first example of the present system 1, and FIG. 10A illustrates a state in which a participant H1 of a meeting is speaking, FIG. 10B illustrates a state in which a participant H2 is speaking, and FIG. 10C illustrates a state in which a participant H3 is speaking.

In FIG. 10, the microphone device 10 is installed on a ceiling of a conference room. Two individual sound pickup areas IR1 and IR2 are set within a sound pickup area R of the microphone device 10. The participant H1 and the participant H2 belong to the individual sound pickup area IR1 and the participant H3 belongs to the individual sound pickup area IR2. An output channel "Ch1" is set in the individual sound pickup area IR1, and an output channel "Ch2" is set in the individual sound pickup area IR2.

In this state, when the participant H1 speaks, the microphone device 10 generates a sound signal corresponding to voice of the participant (speaking person) H1, and outputs the sound signal as a sound signal of the output channel "Ch1". At this time, as illustrated in FIG. 10A, pseudo directivity D (hereinafter simply referred to as "directivity D") of the beamforming microphone is directed to the participant H1. Then, when the participant H2 speaks, the microphone device 10 generates a sound signal corresponding to voice of the participant (speaking person) H2, and outputs the sound signal as the sound signal of the output channel "Ch1". At this time, as illustrated in FIG. 10B, the directivity D is directed to the participant H2. In this way, when the two sound sources (participants H1, H2) belong to the same individual sound pickup area IR1 but the sound source positions are different, the directivity D is directed to each sound source position. Consequently, even though the sound signals from different sound sources are output via the same output channel "Ch1", the voice of each of the participant H1 and H2 is clear. Then, when the participant H3 speaks, the microphone device 10 generates a sound signal corresponding to voice of the participant (speaking person) H3, and outputs the sound signal as a sound signal of the output channel "Ch2". At this time, as illustrated in FIG. 10C, the directivity D is directed to the participant H3. In contrast, even though sound (for example, utterance of assistant H4 of the conference) occurs in an area other than the individual sound pickup areas IR1 and IR2, the microphone device 10 does not generate nor output a sound signal and the directivity D is not directed to the sound source.

Example 2

Figure 11:
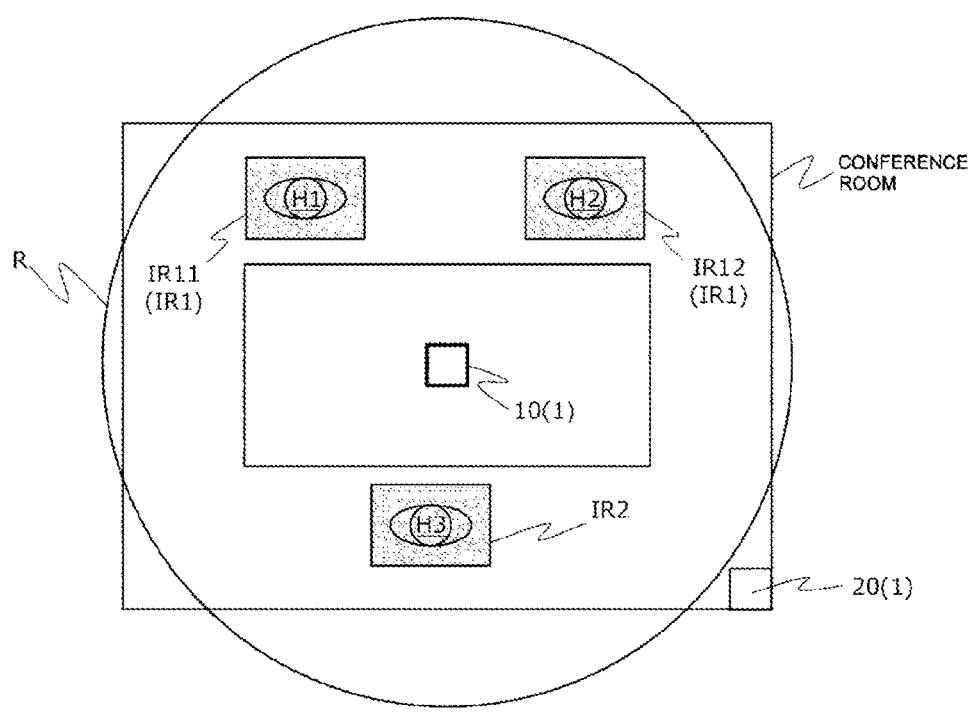
FIG. 11 is a schematic diagram illustrating a second example of the beamforming microphone system in FIG. 1.

FIG. 11 is a schematic diagram illustrating a second example of the present system 1.

In FIG. 11, the microphone device 10 is installed on the ceiling of the conference room. The two individual sound pickup areas IR1 and IR2 are set within the sound pickup area R of the microphone device 10. The individual sound pickup area IR1 includes two small areas IR11 and IR12 arranged apart from each other. The participant H1 belongs to the small area IR11 and the participant H2 belongs to the small area IR12. The participant H3 belongs to the individual sound pickup area IR2. The output channel "Ch1" is set in the individual sound pickup area IR1 and the output channel "Ch2" is set in the individual sound pickup area IR2. The operation of the microphone device 10 in this state is the same as the operation in the first example. In this way, in the present system 1, the plurality (two) of small areas IR11 and IR12 arranged apart from each other are settable as one individual sound pickup area IR1, and the same output channel "Ch1" is settable for each sound signal from the plurality of small areas IR11 and IR12 arranged apart from each other.

Example 3

Figure 12:
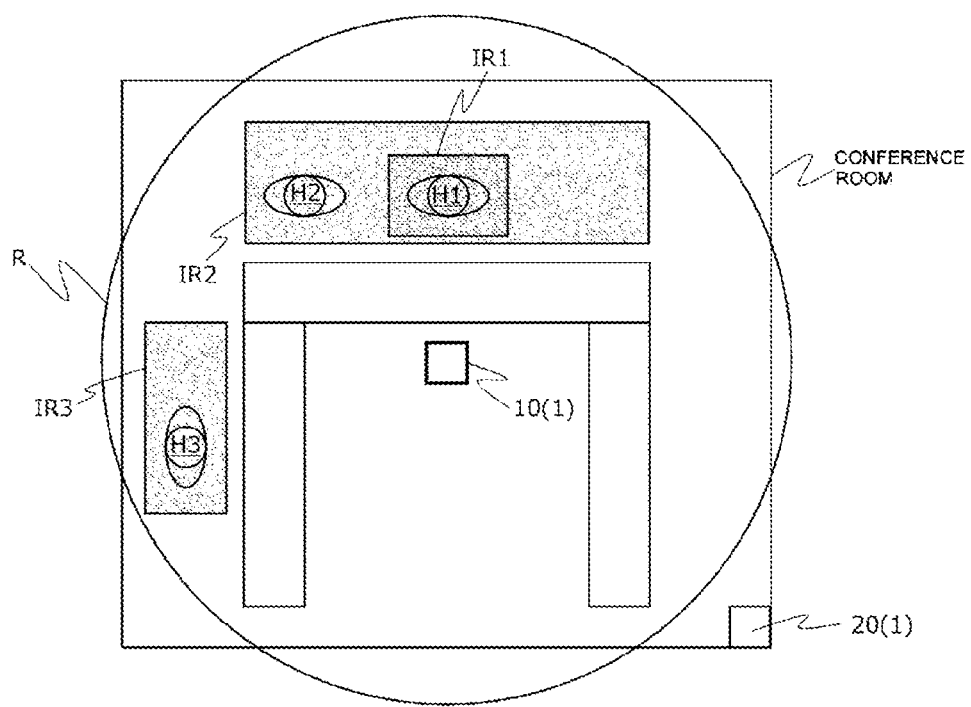
FIG. 12 is a schematic diagram illustrating a third example of the beamforming microphone system in FIG. 1.

FIG. 12 is a schematic diagram illustrating a third example of the present system 1.

In FIG. 12, the microphone device 10 is installed on the ceiling of the conference room. The three individual sound pickup areas IR1, IR2, and IR3 are set within the sound pickup area R of the microphone device 10. The participant H1 belongs to the individual sound pickup area IR1, the participants H1 and H2 belong to the individual sound pickup area IR2, and the participant H3 belongs to the individual sound pickup area IR3. That is, a part of the individual sound pickup area IR2 (a part corresponding to a seat of the participant H1) is overlappingly set with the individual sound pickup area IR1. The participant H1 belongs to the two individual sound pickup areas IR1 and IR2. The output channel "Ch1" is set in the individual sound pickup area IR1, the output channel "Ch2" is set in the individual sound pickup area IR2, and the output channel "Ch3" is set in the individual sound pickup area IR3.

In this state, when the participant H1 speaks, the microphone device 10 generates the sound signal corresponding to the voice of the participant H1 and outputs the sound signal via the output channels "Ch1" and "Ch2". Consequently, for example, while outputting the sound signals of the participants H1 and H2 via the same output channel "Ch1", the present system 1 is able to increase or decrease (adjust) a level only for the sound signal of the participant H1 (president of a company, etc.) output via the "Ch2" and output the adjusted sound signal.

Example 4

Figure 13:
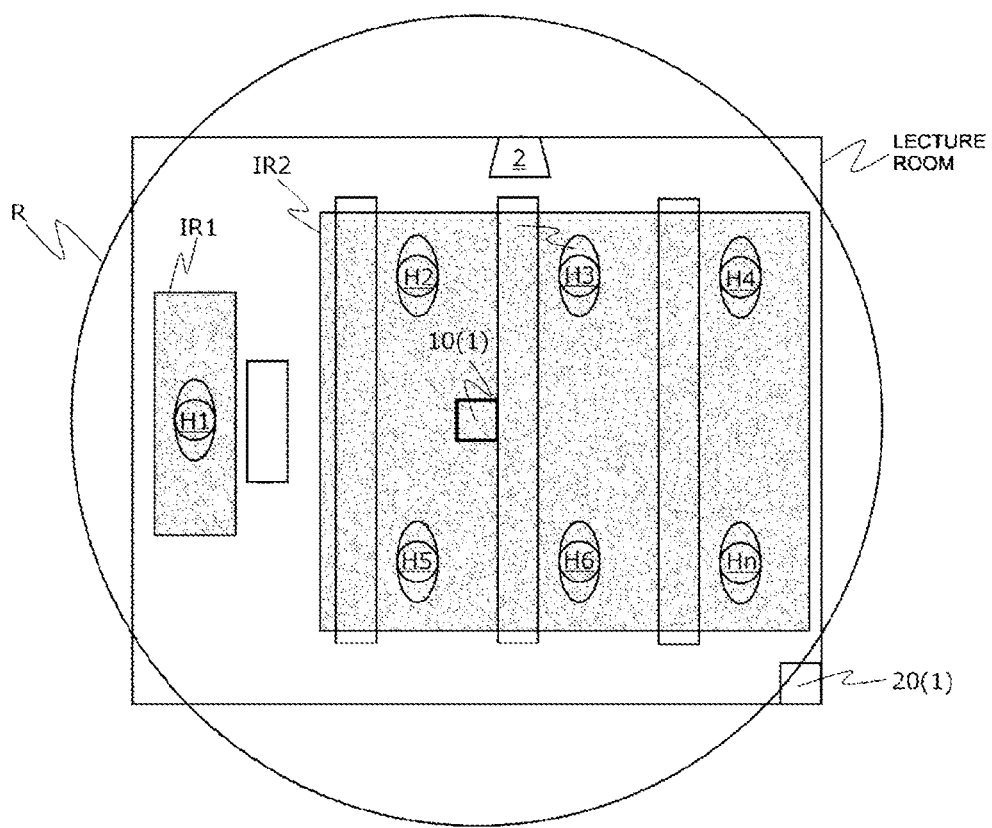
FIG. 13 is a schematic diagram illustrating a fourth example of the beamforming microphone system in FIG. 1.

FIG. 13 is a schematic diagram illustrating a fourth example of the present system 1.

In FIG. 13, the microphone device 10 is installed on a ceiling of a lecture room. The two individual sound pickup areas IR1 and IR2 are set within the sound pickup area R of the microphone device 10. A lecturer H1 belongs to the individual sound pickup area IR1 and a plurality of listeners H2 to Hn belongs to the individual sound pickup area IR2. The output channel "Ch1" is set in the individual sound pickup area IR1 and the output channel "Ch2" is set in the individual sound pickup area IR2. Further the individual sound pickup area IR is not set to a speaker (external device) 2 in the lecture room.

In this state, for example, during the lecture by the lecturer H1, the output channel "Ch1" is muted off and the output channel "Ch2" is muted on. Consequently, the present device 20 is able to cut only the output of noise such as an undesired sound from the listeners H2 to Hn during the lecture. Meanwhile, during a question-and-answer session, for example, the output channel "Ch1" and "Ch2" are muted off. Consequently, the present system 1 is able to output voice (sound signal) of the lecturer H1 who is answering questions and voice (sound signals) of the listeners H2 to Hn who are asking questions via the different output channels "Ch1" and "Ch2", respectively. Further, a sound signal corresponding to sound from the speaker (external device) 2 is not generated, and thus howling based on the sound from the speaker (external device) 2 does not occur.

Example 5

Figure 14:
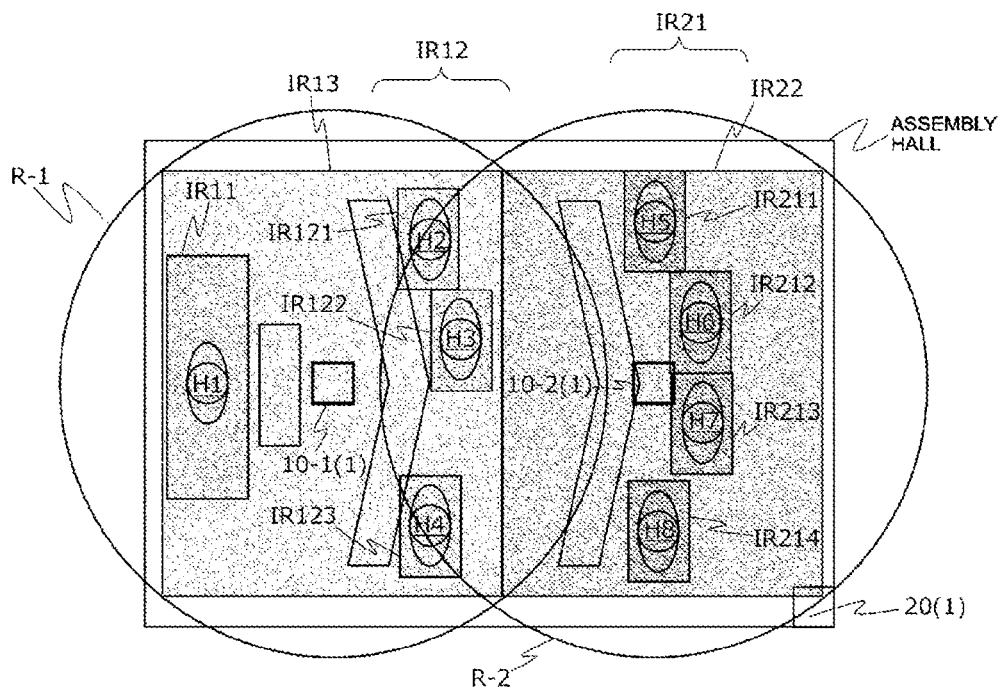
FIG. 14 is a schematic diagram illustrating a fifth example of the beamforming microphone system in FIG. 1.

FIG. 14 is a schematic diagram illustrating a fifth example of the present system 1.

In FIG. 14, two microphone devices 10-1 and 10-2 are installed on a ceiling of an assembly hall. Three individual sound pickup areas IR11, IR12, and IR13 are set in a sound pickup area R-1 of the microphone device 10-1. The individual sound pickup area IR12 includes three small areas IR121, IR122, and IR123 arranged apart from one another. The individual sound pickup area IR13 is set in a front half part of the assembly hall. All of the individual sound pickup areas IR11 to IR12 overlap with a part of the individual sound pickup area IR13. In contrast, two individual sound pickup areas IR21 and IR22 are set in a sound pickup area R-2 of the microphone device 10-2. A part of the sound pickup area R-2 overlaps with a part of the sound pickup area R-1. The individual sound pickup area IR21 includes four small areas IR211, IR212, IR213, and IR214 arranged apart from one another. The individual sound pickup area IR22 is set in a back half part of the assembly hall. All of the individual sound pickup area IR21 overlap with a part of the individual sound pickup area IR22. A chairperson H1 belongs to the individual sound pickup area IR11. Assembly members H2, H3, and H4 belong to the small areas IR121, IR122, and IR123, respectively, and assembly members H5, H6, H7, and H8 belong to the small areas IR211, IR212, IR213, and IR214, respectively.

In this state, the present device 20 is able to receive sound signals of the individual sound pickup areas IR11 to IR13 and IR21 to IR22 from the two microphone devices 10-1 and 10-2. Then, the present device 20 is able to generate data for delivery with clear voice of each assembly member H1 to H8 by, for example, increasing or decreasing (adjusting) a level of the sound signal from each individual sound pickup area IR11 to IR12 and IR21 and combining the sound signals. Further, the present device 20 is able to generate back-up data of voices in the whole assembly hall, based on the sound signals from the individual sound pickup areas IR13 and IR22. In this way, the present system 1 is able to install a plurality of microphone devices 10 and set the individual sound pickup area IR for each microphone device 10 in a large room such as the assembly hall.

Conclusion

According to the embodiments described above, the present system 1 includes the plurality of microphone units 11, the signal processing unit 12 that processes the sound pickup signal, and the storage 13 that associates the sound pickup area information with the individual-sound-pickup-area position information and stores the associated information. The signal processing unit 12 includes the position information identification unit 121 that identifies the sound source position information, based on the sound pickup signal, the signal generation unit 123 that generates the sound signal, based on the sound pickup signal, and the channel assignment unit 125 that assigns, to the individual sound pickup area, one output channel corresponding to the individual sound pickup area to which the sound source position belongs. The position of the individual sound pickup area with respect to the sound pickup area is freely set. According to this configuration, the present system 1 sets any number and size of individual sound pickup areas for each sound pickup area, based on the individual-sound-pickup-area position information stored in the storage 13. That is, in the present system 1, the individual sound pickup area (area in which the directivity is directed, area in which the sound source position is searched) is flexibly settable in the sound pickup area. Further, the present system 1 executes the calculation (calculation of directivity) to direct the directivity only to the individual sound pickup area, but not to the whole sound pickup area. Thus, in the present system 1, the amount (number of times) of the calculation of directivity is reduced more than the amount of the calculation of directivity in a conventional system, and a processing load caused by the calculation is reduced.

Further, according to the embodiments described above, the signal generation unit 123 generates a sound signal only when the sound source position belongs to at least any one of the individual sound pickup areas. According to this configuration, the present system 1 executes the calculation of directivity (directing the directivity) only to the sound source belonging to the individual sound pickup area, but not to the whole sound pickup area. Thus, in the present system 1, the amount (number of times) of the calculation of directivity is reduced more than the amount of the calculation of directivity in the conventional system, and the processing load caused by the calculation is reduced.

Further, according to the embodiments described above, the plurality of individual sound pickup areas is set within the sound pickup area. The channel assignment unit 125 assigns the output channel corresponding to each of the plurality of individual sound pickup areas. According to this configuration, unlike the conventional system, the present system 1 is able to flexibly set the output channel for each individual sound pickup area. That is, in the present system 1, the individual sound pickup area is settable more flexibly than the conventional system, and responses to various requests can be made with a single operating specification (rule).

Further, according to the embodiments described above, the individual sound pickup area includes a plurality of individual sound pickup areas (first-individual-sound-pickup area and second-individual-sound-pickup area). Apart or a whole part of each individual sound pickup area can overlap with one another. According to this configuration, in the present system 1, the individual sound pickup area is settable more flexibly than the conventional system.

Further, according to the embodiments described above, the individual sound pickup area includes the plurality of small areas arranged apart from one another. According to this configuration, in the present system 1, the individual sound pickup area is settable more flexibly than the conventional system in which a plurality of sound pickup areas is always in contact with one another.

Further, according to the embodiments described above, the signal processing unit 12 includes the voice determination unit 122 that determines whether a sound pickup signal is a voice signal. When the voice determination unit 122 determines that the sound pickup signal is the voice signal, the signal generation unit 123 generates a sound signal. According to this configuration, the signal generation unit 123 does not execute the calculation of directivity when the sound from the sound source is sound other than voice (such as noise). Thus, in the present system 1, the processing load caused by the calculation is reduced.

Further, according to the embodiments described above, the plurality of microphone units 11 constitutes one beamforming microphone. The beamforming microphone directs the directivity to the sound source position when the signal generation unit 123 generates the sound signal. According to this configuration, the present system 1 directs the directivity only to the individual sound pickup area, but not to the whole sound pickup area. That is, according to this configuration, the present system 1 executes the calculation of directivity only for the individual sound pickup area. Thus, in the present system 1, the processing load caused by the calculation is reduced.

Further, according to the embodiments described above, the storage 13 stores the correspondence relation information indicating correspondence relation between each of the plurality of individual-sound-pickup-area position information and the output channel information. The channel assignment unit 125 assigns the output channel, based on the correspondence relation information. According to this configuration, in the present system 1, the correspondence relation information is previously generated, and thus the output channel of each individual sound pickup area is flexibly settable for each sound pickup area.

Further, according to the embodiments described above, the present system 1 includes the operation unit 24 operated by a user and the correspondence relation setting unit 223. The correspondence relation setting unit 223 sets the correspondence relation between the individual-sound-pickup-area position information and the output channel information indicating the output channel freely set (selected) by the user operating the operation unit 24. According to this configuration, in the present system 1, the output channel of each individual sound pickup area is flexibly settable for each sound pickup area, based on the operation of the operation unit 24 by the user.

Further, according to the embodiments described above, the present system 1 includes the pointing device (operation unit 24) used by the user and the area setting unit 222 for setting the individual sound pickup area, based on the operation of the pointing device. The area setting unit 222 sets, as the individual sound pickup area, the area (candidate area) defined by the user operating the pointing device. According to this configuration, in the present system 1, any number, any shape, and any size of the individual sound pickup areas are flexibly settable based on the operation of the pointing device by the user.

Further, according to the embodiments described above, the present system 1 identifies the sound source position within the sound pickup area every 5 ms, generates the sound signal corresponding to the sound from the sound source, and outputs the sound signal via the output channel corresponding to the individual sound pickup area to which the sound source position belongs. In other words, the present system 1 directs the directivity only to the sound source belonging to the individual sound pickup area at time intervals of high speed being 5 ms. That is, the present system 1 is able to change the direction of the directivity and switch the output channel every 5 ms. According to this configuration, the present system 1 is able to pick up audibly seamless sound across the plurality of output channels while using one virtual beam of the beamforming microphone.

Note that the present device need not include a mixer unit. That is, the present device need not have a function as a mixer. In this case, the present system may include a mixer connected to the microphone device and the external device. In this case, the mixer may, for example, execute the above-described signal processing for the sound signal for each output channel and output the processed sound signal to the external device.

Further, the microphone device in the present invention may have a mixer function. In this case, the microphone device in the present invention may, for example, be connected to the external device, execute the above-described signal processing for the sound signal for each output channel, and output the processed sound signal to the external device.

Further, the present device is not limited to a personal computer. That is, for example, the present device may be a smartphone or a tablet-PC on which the present setting program operates.

Further, the signal processing unit in the present invention may be accommodated in a housing different from the microphone unit.

Further, the microphone device in the present invention need not include the voice determination unit. In this case, the present system generates the sound signal in the sound pickup processing without executing the voice determination processing.

Further, a shape of the housing of the microphone device in the present invention is not limited to the present embodiments. That is, for example, the housing of the microphone device in the present invention may have a circular box shape in a plan view.

Further, the present system may set, in the sound pickup area, the individual output channel that outputs the sound pickup signal without generating the sound signal in the sound pickup processing. In this case, the present system is also able to pick up unadjusted sound in which the sound of the sound source is not emphasized.

Further, the processor that configures the signal processing unit and the control unit in the present invention is not limited to the CPU. That is, for example, the processor may include hardware such as a graphics processing unit (GPU), a micro processing unit (MPU), a digital signal processing unit (DSP), or a field programmable gate array (FPGA) in addition to or instead of the CPU.

Further, the medium on which the programs (the present sound pickup program and the present setting program) according to the present invention are stored is not limited to the ROM. That is, for example, the programs according to the present invention may be stored in a storage or other information storage medium (secure digital (SD) memory card, universal serial bus (USB) memory, or the like) and provided to the signal processing unit.

Further, the present system may include a plurality of imaging devices for capturing at least a portion of a video within the sound pickup area. That is, for example, the present system may include each of a plurality of imaging devices corresponding to each of the plurality of individual sound pickup areas. In this case, for example, the present device performs setting in such a way that an imaging range (angle of view) of each imaging device captures all the corresponding individual sound pickup area. The setting of the imaging range for each imaging device is, for example, stored in the storage of the present device in association with the correspondence relation.

Figure 15:
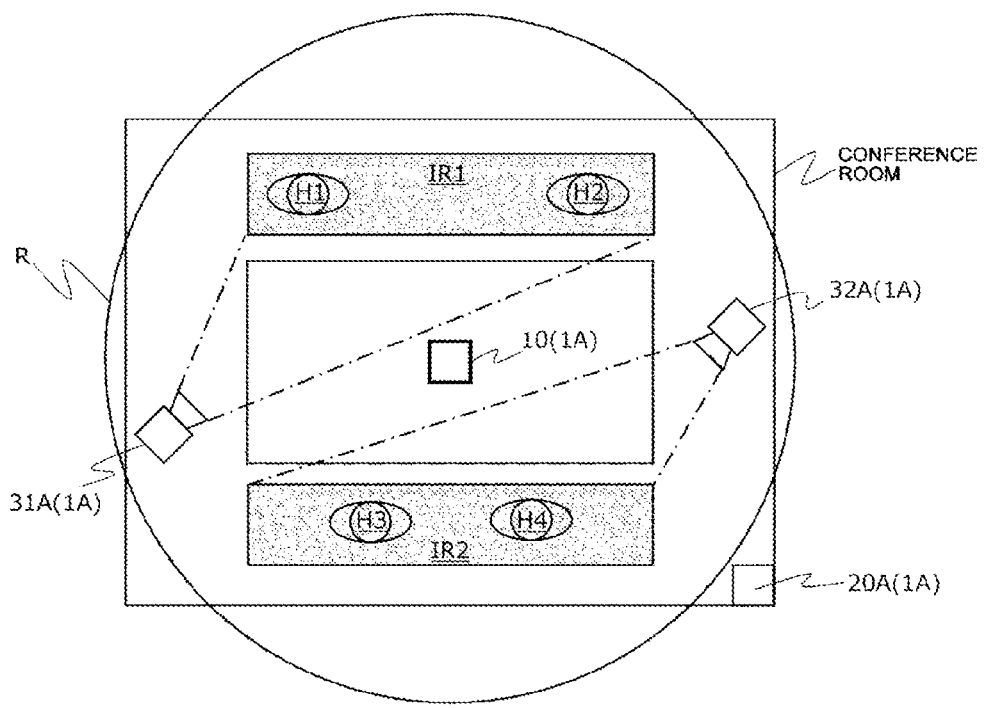
FIG. 15 is a schematic diagram illustrating a first modification example of the beamforming microphone system in FIG. 1.

FIG. 15 is a schematic diagram illustrating a first modification example of the present system.

The figure illustrates that a present system 1A includes two imaging devices 31A and 32A. In the figure, an imaging range (angle of view) of each of the imaging devices 31A and 32A is indicated with a chain line.

In FIG. 15, the microphone device 10 and each of the imaging devices 31A and 32A are installed on a ceiling of a conference room. The imaging range of the imaging device 31A is set to capture all of the individual sound pickup area IR1, and the imaging range of the imaging device 32A is set to capture all of the individual sound pickup area IR2. That is, the imaging device 31A corresponds to the individual sound pickup area IR1 and the imaging device 32A corresponds to the individual sound pickup area IR2. Further, the imaging range of the imaging device 31A differs from the imaging range of the imaging device 32A. Images captured by the imaging devices 31A and 32A are transmitted to a present device 20A. Participants H1 and H2 belong to the individual sound pickup area IR1, and participants H3 and H4 belong to the individual sound pickup area IR2. Herein, the individual sound pickup area IR1 is an example of a first-individual-sound-pickup area in the present invention, and the individual sound pickup area IR2 is an example of a second-individual-sound-pickup area in the present invention. The imaging device 31A is an example of a first imaging device in the present invention, and the imaging device 32A is an example of a second imaging device in the present invention. In this state, for example, when the participant H1 is speaking, the present device 20A outputs an image captured by the imaging device 31A (hereinafter referred to as "first image") together with a sound signal corresponding to the participant H1. The participants H1 and H2 are captured in the first image. In this state, when the participant H2 speaks, the present device 20A outputs the sound signal corresponding to the participant H2 and continues to output the first image. In contrast, when the participant H3 speaks, the present device 20A outputs an image (hereinafter referred to as a "second image") captured by the imaging device 32A together with a sound signal corresponding to the participant H3. The second image is an image in which the participants H3 and H4 are captured. Thus, even though the speaking person (participant H1, H2) switches within the imaging range of the imaging device 31A, the present device 20A generates only the sound signal to be output according to the speaking person and the images to be output remain the first images without switching. In contrast, when the speaking person switches from the imaging range of the imaging device 31A to another imaging range of the imaging device 32A (e.g., from participant H1 to participant H3), the present device 20A also switches the images to be output from the first image to the second image. In this configuration, the present system 1A is able to output images in which the speaking person is captured at all time by using a smaller number of imaging devices 31A and 32A than the number of speaking persons, even though the sound source position switches at high speed (in the present embodiments, 5 ms) in the same or different individual sound pickup area IR. In this way, the present system 1A associates the individual sound pickup area with the imaging range, and thus is able to output the images in which each speaking person is captured without requiring the imaging device for each speaking person. Further, the present system 1A is able to freely set the imaging range of the imaging devices 31A and 32A regardless of the number of speaking persons.

Figure 16:
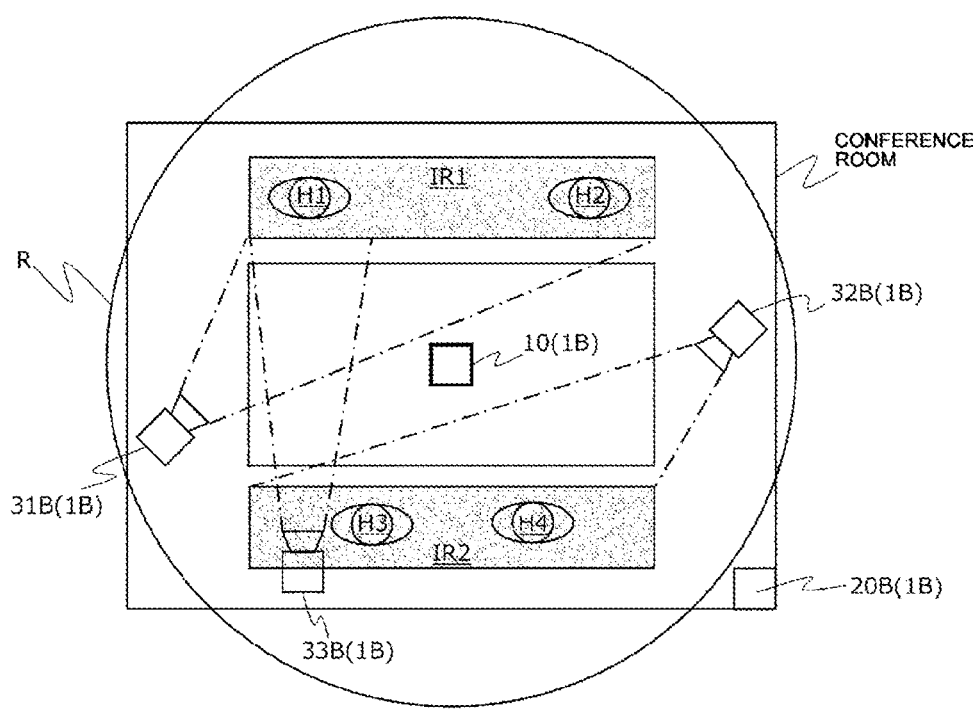
FIG. 16 is a schematic diagram illustrating a second modification example of the beamforming microphone system in FIG. 1.

FIG. 16 is a schematic diagram illustrating a second modification example of the present system.

The figure illustrates that the present system 1B includes three imaging devices 31B, 32B, and 33B. The figure indicates that an imaging range of each of the imaging devices 31B to 33B with a chain line.

In FIG. 16, the microphone device 10 and each of the imaging devices 31B to 33B are installed on the ceiling of the conference room. The imaging range of the imaging device 31B is set to capture all of the individual sound pickup area IR1, the imaging range of the imaging device 32B is set to capture all of the individual sound pickup area IR2, and the imaging range of the imaging device 33B is set to capture a part (participant H1 described later) of the individual sound pickup area IR1. The images captured by the imaging devices 31B to 33B are transmitted to a present device 20B. The participants H1 and H2 belong to the individual sound pickup area IR1 and the participants H3 and H4 belong to the individual sound pickup area IR2. Herein, the individual sound pickup area IR1 is an example of the first-individual-sound-pickup area in the present invention, and the individual sound pickup area IR2 is an example of the second-individual-sound-pickup area in the present invention. The imaging devices 31B and 33B are an example of an individual imaging device (first imaging device) in the present invention, and the imaging device 32B is an example of a second imaging device in the present invention. In this state, operation of the present system 1B when the participants H2 to H4 are speaking is common to the operation of the present system 1A in the first modification example. Meanwhile, when the participant H1 is speaking, the present device 20B outputs an image being captured by the imaging device 31B and/or the imaging device 33B together with a sound signal corresponding to the participant H1. In this configuration, when an important person such as a president of a company is speaking, the present system 1B is able to output an image in which only the important person is captured and an image in which an individual sound pickup area to which the important person belongs is captured.

Note that the number, arrangement, and the imaging range of the imaging device in the present invention are not limited to the modification examples. That is, for example, among the plurality of imaging devices, the imaging range of one imaging device may be set to capture an overhead image of the whole sound pickup area, and the imaging range of the other imaging devices may be set to capture corresponding individual sound pickup areas.

Further, in each modification example, the microphone device in the present invention may include each imaging device.

Features of the beamforming microphone system, the sound pickup program and the setting program for the beamforming microphone system, the information processing device, and the information processing method according to the present invention described above are summarized below.

(Feature 1)

A beamforming microphone system comprising:
a plurality of microphone units;
a signal processing unit configured to process a sound pickup signal from each of the plurality of microphone units at each predetermined time; and
a storage configured to associate, for each sound pickup area where the plurality of microphone units is able to pick up sound as a sound signal, sound pickup area information indicating a sound pickup area with individual-sound-pickup-area position information indicating a position of at least one of individual sound pickup areas freely set within the sound pickup area, and store the associated information, wherein
the signal processing unit includes:
a position information identification unit configured to identify sound source position information indicating a sound source position of a sound source in the individual sound pickup area, based on the sound pickup signal from each of the plurality of microphone units;
a signal generation unit configured to generate the sound signal corresponding to the sound from the sound source position, based on the sound pickup signal from each of the plurality of microphone units; and
a channel assignment unit configured to assign, to the individual sound pickup area, one output channel from which the sound signal is output, from among the plurality of output channels, based on the individual-sound-pickup-area position information indicating the individual sound pickup area to which the sound source position belongs.

(Feature 2)

The beamforming microphone system according to feature 1, wherein the signal generation unit generates the sound signal only when the sound source position belongs to at least one of the individual sound pickup areas.

(Feature 3)

The beamforming microphone system according to feature 1 or 2, wherein
the plurality of individual sound pickup areas is set within the sound pickup area, and the channel assignment unit assigns the output channel corresponding to each of the plurality of individual sound pickup areas.

(Feature 4)

The beamforming microphone system according to feature 3, wherein
the plurality of individual sound pickup areas includes:
a first-individual-sound-pickup area; and
a second-individual-sound-pickup area set separately from the first-individual-sound-pickup area, and
a part or a whole part of the second-individual-sound-pickup area is settable overlappingly with the first-individual-sound-pickup area.

(Feature 5)

The beamforming microphone system according to any one of features 1 to 4, wherein the individual sound pickup area includes a plurality of small areas arranged apart from each other.

(Feature 6)

The beamforming microphone system according to any one of features 1 to 5, wherein
the signal processing unit includes a voice determination unit configured to determine whether the sound pickup signal from the plurality of microphone units is a sound signal corresponding to voice of a speaking person, and
the signal generation unit generates the sound signal when the voice determination unit determines that the sound pickup signal is the voice signal.

(Feature 7)

The beamforming microphone system according to feature 3, wherein
the storage stores, for each sound pickup area, correspondence relation information indicating correspondence relation between each of the plurality of individual-sound-pickup-area position information and output channel information indicating any output channel among the plurality of output channels, and
the channel assignment unit assigns the output channel, based on the correspondence relation information.

(Feature 8)

The beamforming microphone system according to feature 7, further comprising:
an operation unit configured to be operated by a user; and
a correspondence relation setting unit configured to set, for each sound pickup area, the correspondence relation between the individual-sound-pickup-area position information and the output channel information indicating the output channel to be set in the individual sound pickup area, based on operation of the operation unit, wherein
the correspondence relation setting unit sets the correspondence relation between the individual-sound-pickup-area position information and the output channel information indicating the output channel to be freely set by the user operating the operation unit.

(Feature 9)

The beamforming microphone system according to any one of features 1 to 8, further comprising:
a pointing device configured to be operated by a user; and
an area setting unit configured to set the individual sound pickup area, based on operation of the pointing device, wherein
the area setting unit sets, as the individual sound pickup area, an area freely defined by the user operating the pointing device.

(Feature 10)

The beamforming microphone system according to any one of features 1 to 9, wherein the predetermined time is 5 ms.

(Feature 11)

The beamforming microphone system according to feature 3, further comprising:
a plurality of imaging devices configured to image at least a part within the sound pickup area, wherein
the plurality of individual sound pickup areas includes:
a first-individual-sound-pickup area; and
a second-individual-sound-pickup area set separately from the first-individual-sound-pickup area, and
the plurality of imaging devices includes:
a first imaging device corresponding to the first-individual-sound-pickup area; and
a second imaging device corresponding to the second-individual-sound-pickup area.

(Feature 12)

The beamforming microphone system according to feature 11, wherein an imaging range of the first imaging device is different from an imaging range of the second imaging device.

(Feature 13)

The beamforming microphone system according to feature 11 or 12, wherein
the first imaging device includes a plurality of individual imaging devices, and
an imaging range of each of the plurality of individual imaging devices includes a different area within the first-individual-sound-pickup area.

(Feature 14)

A non-transitory storage medium storing a sound pickup program for a beamforming microphone system, the sound pickup program used to output a sound pickup signal corresponding to sound picked up by a plurality of microphone units, wherein
the beamforming microphone system includes:
at least one processor configured to process the sound pickup signal; and
a storage configured to store:
sound pickup area information indicating a sound pick up area where the plurality of microphone units is able to pick up the sound as a sound signal;
individual-sound-pickup-area position information indicating a position of at least one of individual sound pickup areas freely set within the sound pickup area; and
correspondence relation information indicating correspondence relation between the individual-sound-pickup-area position information and output channel information indicating any output channel among the plurality of output channels, and
the non-transitory storage medium storing the sound pickup program for the beamforming microphone system executable on a processor to cause the at least one processor to function as:
a position information identification unit configured to identify sound source position information indicating a sound source position of a sound source in the individual sound pickup area;
a signal generation unit configured to generate the sound signal corresponding to the sound from the sound source position, based on the sound pickup signal from each of the plurality of microphone units; and
a channel assignment unit configured to assign, to the individual sound pickup area, one output channel from which the sound signal is output, from among the plurality of output channels, based on the correspondence relation information.

(Feature 15)

A non-transitory storage medium storing a setting program for a beamforming microphone system, the setting program used to set correspondence relation between an individual-sound-pickup-area position information indicating a position of an individual sound pickup area of a plurality of microphone units and output channel information indicating any output channel among the plurality of output channels, wherein
the beamforming microphone system includes a computer to be used for setting the correspondence relation,
the computer includes:
a storage configured to store the correspondence relation; and
a display unit configured to display a layout of an installation location in which the microphone unit is installed, and
the non-transitory storage medium storing the setting program for the beamforming microphone system executable on a computer to cause the computer to function as:
a sound pickup area display unit configured to overlappingly display, on the display unit, the layout and the sound pickup area with each other;
a candidate area display unit configured to overlappingly display, on the display unit, the layout, the sound pickup area, and a candidate area of the individual sound pickup area with one another;
a position information setting unit configured to identify a candidate area position information indicating a position of the candidate area and set the candidate area position information as the individual-sound-pickup-area position information; and
a correspondence relation setting unit configured to set, for each sound pickup area, the correspondence relation between the individual-sound-pickup-area position information and the output channel information indicating the output channel set in the individual sound pickup area.

(Feature 16)

A beamforming microphone setting device for setting correspondence relation between individual-sound-pickup-area position information indicating a position of an individual sound pickup area included in a sound pickup area of a plurality of microphone units and output channel information indicating any output channel among the plurality of output channels, the beamforming microphone setting device comprising:
a storage configured to store the correspondence relation;
a display unit configured to display a layout of an installation location in which the microphone unit is installed;
a sound pickup area display unit configured to overlappingly display, on the display unit, the layout and the sound pickup area with each other;
a candidate area display unit configured to overlappingly display, on the display unit, the layout, the sound pickup area, and a candidate area of the individual sound pickup area with one another;
a position information setting unit configured to identify a candidate area position information indicating a position of the candidate area and set the candidate area position information as the individual-sound-pickup-area position information; and
a correspondence relation setting unit configured to set, for each sound pickup area, the correspondence relation between the individual-sound-pickup-area position information and the output channel information indicating the output channel set in the individual sound pickup area.
(Feature 17)

A beamforming microphone system setting method executed by a setting device for setting correspondence relation between individual-sound-pickup-area position information indicating a position of an individual sound pickup area included in a sound pickup area of a plurality of microphone units and output channel information indicating any output channel among the plurality of output channels, wherein
the setting device includes:
a storage configured to store the correspondence relation; and
a display unit configured to display a layout of an installation location in which the microphone unit is installed, and
the beamforming microphone system setting method executed by the setting device comprising:
overlappingly displaying, on the display unit, the layout and the sound pickup area with each other;
overlappingly displaying, on the display unit, the layout, the sound pickup area, and a candidate area of the individual sound pickup area with one another;
identifying candidate area position information indicating a position of the candidate area and setting the candidate area position information as the individual-sound-pickup-area position information; and
setting, for each sound pickup area, the correspondence relation between the individual-sound-pickup-area position information and the output channel information indicating the output channel set in the individual sound pickup area.

What is claimed is:
1. A beamforming microphone system, comprising:
a plurality of microphone units;
a pointing device configured operable by a user;
a signal processing unit configured to process a sound pickup signal from each of the plurality of microphone units;
an area setting unit configured to set one or more individual sound pickup areas for a sound pickup area based on operation of the pointing device; and
a storage configured to associate, for each sound pickup area where the plurality of microphone units is able to pick up sound as a sound signal, sound pickup area information indicating a sound pickup area with individual-sound-pickup-area position information indicating a position of at least one individual sound pickup area of the one or more individual sound pickup areas set within the sound pickup area, and store the associated information,
wherein a position, number, and size of each of the one or more individual sound pickup areas within the sound pickup are definable by the user operating the pointing device,
wherein the area setting unit sets each of the one or more individual sound pickup areas based on how each of the one or more individual sound pickup areas is defined by the user operating the pointing device, and
wherein the signal processing unit includes:
a position information identification unit configured to identify sound source position information indicating a sound source position of a sound source in the one or more individual sound pickup areas, based on the sound pickup signal from each of the plurality of microphone units;
a signal generation unit configured to generate the sound signal corresponding to the sound from the sound source position, based on the sound pickup signal from each of the plurality of microphone units; and
a channel assignment unit configured to assign, to the one or more individual sound pickup areas, one output channel from which the sound signal is output, from among the plurality of output channels, based on the individual-sound-pickup-area position information indicating the individual sound pickup area to which the sound source position belongs.

2. The beamforming microphone system according to claim 1, wherein the signal generation unit generates the sound signal only when the sound source position belongs to at least one of the individual sound pickup areas.

3. The beamforming microphone system according to claim 1, wherein
the plurality of individual sound pickup areas is set within the sound pickup area, and
the channel assignment unit assigns the output channel corresponding to each of the plurality of individual sound pickup areas.

4. The beamforming microphone system according to claim 3, wherein
the plurality of individual sound pickup areas includes:
a first-individual-sound-pickup area; and
a second-individual-sound-pickup area set separately from the first-individual-sound-pickup area, and
a part or a whole part of the second-individual-sound-pickup area is settable overlappingly with the first-individual-sound-pickup area.

5. The beamforming microphone system according to claim 1, wherein the individual sound pickup area includes a plurality of small areas arranged apart from each other.

6. The beamforming microphone system according to claim 1, wherein
the signal processing unit includes a voice determination unit configured to determine whether the sound pickup signal from the plurality of microphone units is a sound signal corresponding to voice of a speaking person, and
the signal generation unit generates the sound signal when the voice determination unit determines that the sound pickup signal is the voice signal.

7. The beamforming microphone system according to claim 3, wherein
the storage stores, for each sound pickup area, correspondence relation information indicating correspondence relation between each of the plurality of individual-sound-pickup-area position information and output channel information indicating any output channel among the plurality of output channels, and
the channel assignment unit assigns the output channel, based on the correspondence relation information.

8. The beamforming microphone system according to claim 7, further comprising:
an operation unit configured to be operated by a user; and
a correspondence relation setting unit configured to set, for each sound pickup area, the correspondence relation between the individual- sound-pickup-area position information and the output channel information indicating the output channel to be set in the individual sound pickup area, based on operation of the operation unit, wherein
the correspondence relation setting unit sets the correspondence relation between the individual-sound-pickup-area position information and the output channel information indicating the output channel to be freely set by the user operating the operation unit.

9. The beamforming microphone system according to claim 3, further comprising:
a plurality of imaging devices configured to image at least a part within the sound pickup area, wherein
the plurality of individual sound pickup areas includes:
a first-individual-sound-pickup area; and
a second-individual-sound-pickup area set separately from the first-individual-sound-pickup area, and
the plurality of imaging devices includes:
a first imaging device corresponding to the first- individual-sound-pickup area; and
a second imaging device corresponding to the second-individual-sound-pickup area.

10. The beamforming microphone system according to claim 9, wherein
the first imaging device includes a plurality of individual imaging devices, and
an imaging range of each of the plurality of individual imaging devices includes a different area within the first-individual-sound- pickup area.

11. A non-transitory storage medium storing a sound pickup program for a beamforming microphone system, the sound pickup program used to output a sound pickup signal corresponding to sound picked up by a plurality of microphone units, wherein
the beamforming microphone system includes:
at least one processor configured to process the sound pickup signal; and
a storage configured to store:
sound pickup area information indicating a sound pick up area where the plurality of microphone units is able to pick up the sound as a sound signal;
individual-sound-pickup-area position information indicating a position of one or more individual sound pickup areas freely set within the sound pickup area; and
correspondence relation information indicating correspondence relation between the individual-sound-pickup-area position information and output channel information indicating any output channel among the plurality of output channels, and
a pointing device configured operable by a user;
the non-transitory storage medium storing the sound pickup program for the beamforming microphone system executable on a processor to cause the at least one processor to function as:
a position information identification unit configured to identify sound source position information indicating a sound source position of a sound source in the individual sound pickup area;
a signal generation unit configured to generate the sound signal corresponding to the sound from the sound source position, based on the sound pickup signal from each of the plurality of microphone units;
an area setting unit configured to set one or more individual sound pickup areas for a sound pickup area based on operation of the pointing device; and
a channel assignment unit configured to assign, to the individual sound pickup area, one output channel from which the sound signal is output, from among the plurality of output channels, based on the correspondence relation information,
wherein a position, number, and size of each of the one or more individual sound pickup areas within the sound pickup are definable by the user operating the pointing device,
wherein the area setting unit sets each of the one or more individual sound pickup areas based on how each of the one or more individual sound pickup areas is defined by the user operating the pointing device.

* * * * *